(12) United States Patent
Hara

(10) Patent No.: US 11,034,407 B2
(45) Date of Patent: Jun. 15, 2021

(54) VARIABLE STEM FOR HUMAN-POWERED VEHICLE

(71) Applicant: Shimano Inc., Osaka (JP)

(72) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/190,179

(22) Filed: Nov. 14, 2018

(65) Prior Publication Data
US 2020/0148298 A1    May 14, 2020

(51) Int. Cl.
| | |
|---|---|
| *B62K 21/16* | (2006.01) |
| *B62K 23/02* | (2006.01) |
| *B62J 99/00* | (2020.01) |
| *B62J 1/08* | (2006.01) |
| *B62K 25/04* | (2006.01) |
| *B62M 25/08* | (2006.01) |
| *B62M 6/45* | (2010.01) |
| *B62L 3/00* | (2006.01) |
| *B62J 6/01* | (2020.01) |
| *B62J 45/20* | (2020.01) |

(52) U.S. Cl.
CPC .................. *B62K 21/16* (2013.01); *B62J 1/08* (2013.01); *B62J 6/01* (2020.02); *B62J 99/00* (2013.01); *B62K 23/02* (2013.01); *B62K 25/04* (2013.01); *B62L 3/00* (2013.01); *B62M 6/45* (2013.01); *B62M 25/08* (2013.01); *B62J 45/20* (2020.02); *B62J 2001/085* (2013.01); *B62K 2025/044* (2013.01)

(58) Field of Classification Search
CPC ........ B62K 21/16; B62K 21/22; B62K 21/14; B62K 23/02; B62K 25/04; B62K 25/08; B62K 2025/044; B62M 6/45; B62J 99/00; B62J 2001/085; B62J 1/08
See application file for complete search history.

(56) References Cited

U.S. PATENT DOCUMENTS

| | | | | |
|---|---|---|---|---|
| 5,138,900 A | * | 8/1992 | Hals ....................... | B62K 21/16 74/551.1 |
| 5,253,544 A | * | 10/1993 | Allsop .................... | B62K 21/14 280/234 |

(Continued)

FOREIGN PATENT DOCUMENTS

| | | | | |
|---|---|---|---|---|
| CN | 2905637 Y | | 5/2007 | |
| DE | 10210094 A1 | * | 9/2003 | ............. B62K 21/16 |

(Continued)

*Primary Examiner* — Luis A Gonzalez
(74) *Attorney, Agent, or Firm* — Global IP Counselors, LLP

(57) ABSTRACT

A variable stem for a human-powered vehicle basically includes a head tube mount, a handlebar mount, a stem body, a positioning structure and a controller. The stem body couples the handlebar mount to the head tube mount. The stem body is configured to be moved between a first position and a second position. The handlebar mount is disposed at a different location with respect to the head tube mount with the stem body in the first position as compared to the stem body being in the second position. The positioning structure is configured to selectively position the stem body between a first position and a second position. The controller is configured to control the positioning structure while the human-powered vehicle is in a driving state.

16 Claims, 10 Drawing Sheets

(56) References Cited

U.S. PATENT DOCUMENTS

| | | | | |
|---|---|---|---|---|
| 5,273,302 A * | 12/1993 | Ureel | B62K 21/16 280/279 |
| 5,327,798 A * | 7/1994 | Lerch, Jr. | B62K 21/16 292/137 |
| 5,511,444 A * | 4/1996 | Clausen | B62K 21/14 280/276 |
| 5,562,013 A * | 10/1996 | Kao | B62K 21/16 403/81 |
| 5,678,457 A * | 10/1997 | Hals | B62K 21/14 74/551.3 |
| 7,926,386 B1 * | 4/2011 | Godfrey | B62K 21/16 74/551.3 |
| 8,825,322 B1 * | 9/2014 | Ikemoto | B62M 25/08 701/60 |
| 9,446,812 B2 | 9/2016 | Nago | |
| 2005/0120823 A1 * | 6/2005 | Lin | B62K 11/14 74/551.1 |
| 2006/0099027 A1 * | 5/2006 | Liao | B62K 21/12 403/322.4 |
| 2006/0162482 A1 | 7/2006 | Okajima et al. | |
| 2008/0282830 A1 | 11/2008 | Hara | |
| 2013/0042719 A1 * | 2/2013 | Tuma | B62K 21/16 74/551.3 |
| 2016/0280299 A1 * | 9/2016 | Hara | B62J 1/28 |
| 2017/0327180 A1 * | 11/2017 | Hasenyager | B62K 21/22 |

FOREIGN PATENT DOCUMENTS

| | | | | |
|---|---|---|---|---|
| DE | 102012023092 A1 * | 5/2014 | | B62K 21/16 |
| EP | 2 042 419 A1 | 4/2009 | | |
| EP | 3434572 A1 * | 1/2019 | | B62K 21/16 |
| WO | WO-2014123502 A1 * | 8/2014 | | B62K 21/16 |

\* cited by examiner

VARIABLE STEM FOR HUMAN-POWERED VEHICLE

BACKGROUND

Technical Field

The present disclosure generally relates to a variable stem for a human-powered vehicle and/or a component control system having the variable stem.

Background Information

A human-powered vehicle is often provided with a handlebar that is used for steering a wheel or a pair of wheels. A stem is sometimes used to connect the handlebar to a steering part of a steering system. For example, a stem is often used in a bicycle to connect the handlebar to a bicycle steerer tube steering column of the bicycle. One example a stem used with a bicycle is disclosed in European Patent Publication Application No. EP 2 042 419 A1. Some human-powered vehicles include components that are controlled in response to manual operation of a user operated input mounted on the human-powered vehicle. Examples of components that are controlled in response to operation of an operating device include a suspension, a height adjustable seatpost, a shifting device and a braking system.

SUMMARY

In a human-powered vehicle, it is desirable that a rider of the human-powered vehicle be able to comfortably ride the human-powered vehicle. It has been found that depending on the riding conditions, different handlebar height positions are often desired by the rider. However, the height of a handlebar is not adjustable while in a driving state. One object disclosed in the present disclosure is to provide a variable stem that adjusts the height of a handlebar of the human-powered vehicle for different riding conditions while the human-powered vehicle is in a driving state. The variable stem can be a part of a component control system in which either the variable stem is controlled in accordance with information relating to a driving state of the human powered-vehicle, or a component is controlled in accordance with information relating to a state of the variable stem.

Generally, the present disclosure is directed to various features of a variable stem that adjustable supports a handlebar with respect to a frame of a human-powered vehicle. In one feature, a variable stem is provided in which a position of a stem body of the variable stem can be adjusted while in a driving state.

In view of the state of the known technology and in accordance with a first aspect of the present disclosure, a variable stem for a human-powered vehicle that basically comprises a head tube mount, a handlebar mount, a stem body, a positioning structure and a controller. The stem body couples the handlebar mount to the head tube mount. The stem body is configured to be moved between a first position and a second position. The handlebar mount is disposed at a different location with respect to the head tube mount with the stem body in the first position as compared to the stem body being in the second position. The positioning structure is configured to selectively position the stem body between a first position and a second position. The controller is configured to control the positioning structure while the human-powered vehicle is in a driving state.

With the variable stem according to the first aspect, it is possible to adjust a position of the handlebar while driving or riding the human-powered vehicle.

In accordance with a second aspect of the present disclosure, the variable stem according to the first aspect is configured so that the positioning structure includes a movable member movably coupled to one of the head tube mount and the handlebar mount.

With the variable stem according to the second aspect, it is possible to easily engage and disengage the positioning structure to adjust a position of the stem body.

In accordance with a third aspect of the present disclosure, the variable stem according to the second aspect is configured so that the controller includes a driver configured to move the movable member between a rest position and an operated position, the movable member is engaged to one of the head tube mount and the handlebar mount in the rest position, and the movable member is disengaged from the one of the head tube mount and the handlebar mount in the operated position.

With the variable stem according to the third aspect, it is possible to more easily engage and disengage the positioning structure to adjust the position of the stem body.

In accordance with a fourth aspect of the present disclosure, the variable stem according to the third aspect is configured so that the driver includes a cable holder configured to hold a cable extending from an operating device.

With the variable stem according to the fourth aspect, it is possible to adjust the position of the stem body in an easier manner using a cable.

In accordance with a fifth aspect of the present disclosure, the variable stem according to the third or fourth aspect is configured so that the controller further includes an electric actuator configured to activate the driver.

With the variable stem according to the fifth aspect, it is possible to adjust the position of the stem body with minimal effort using an electric actuator.

In accordance with a sixth aspect of the present disclosure, the variable stem according to any one of the first to fifth aspects is configured so that the positioning structure is configured to selectively position the stem body in a third position. The third position is arranged between the first position and the second position.

With the variable stem according to the sixth aspect, it is possible to increase the comfort of the rider by providing an additional position of the stem body.

In accordance with a seventh aspect of the present disclosure, the variable stem according to any one of the first to sixth aspects is comprises at least one sensor arranged to detect a current position of the stem body.

With the variable stem according to the seventh aspect, it is possible to control other components based on the current position of the stem body that is detected by the sensor.

In accordance with an eighth aspect of the present disclosure, the variable stem according to any one of the first to seventh aspects is configured so that the stem body is biased towards one of the first position and the second position.

With the variable stem according to the eighth aspect, it is possible to automatically position the stem body to default position upon disengagement of the movable member of the positioning structure.

In accordance with a ninth aspect of the present disclosure, the variable stem according to any one of the first to eighth aspects is configured so that the stem body includes a linkage interconnecting the head tube mount and the handlebar mount.

With the variable stem according to the ninth aspect, it is possible to easily interconnect the head tube mount and the handlebar mount.

In accordance with a tenth aspect of the present disclosure, the variable stem according to the ninth aspect is configured so that the linkage includes a first link and a second link, the first link having a first end pivotally coupled to the head tube mount and a second end pivotally coupled to the handlebar mount, and the second link having a first end pivotally coupled to the head tube mount and a second end pivotally coupled to the handlebar mount.

With the variable stem according to the tenth aspect, it is possible to maintain the appropriate orientation of the handlebar mount with respect to the head tube mount.

In accordance with an eleventh aspect of the present disclosure, a variable stem for a human-powered vehicle comprises the variable stem according to any one of the first to tenth aspects further comprises at least one detector configured to detect information relating to a driving state of the human powered-vehicle, and the controller is an electronic controller that is configured to control the variable stem in accordance with the information.

With the variable stem according to the eleventh aspect, it is possible to provide a rider with a more comfortable ride by controlling the variable stem in accordance with information relating to a driving state of the human powered-vehicle.

In accordance with a twelfth aspect of the present disclosure, the variable stem according to the eleventh aspect is configured so that the driving state includes at least one of riding condition, power, torque, cadence, velocity, acceleration, vehicle weight, weather, vehicle inclination, road surface condition, travelling route, and state of other components.

With the variable stem according to the twelfth aspect, it is possible to customize the variable stem position in accordance with information relating to a driving state of the human powered-vehicle.

In accordance with a thirteenth aspect of the present disclosure, the variable stem according to the twelfth aspect is configured so that the state of the other components includes a state of at least one of a suspension state, a height adjustable seatpost state, a shifting device state, a braking system state, an assist unit state, a lamp state, and a cycle computer state.

With the variable stem according to the thirteenth aspect, it is possible to customize the variable stem position in accordance with information relating to a driving state of the human powered-vehicle.

In accordance with a fourteenth aspect of the present disclosure, a variable stem for a human-powered vehicle comprises the variable stem according to any one of the first to tenth aspects further comprises at least one sensor configured to detect information relating to a state of the variable stem and the controller is an electronic controller configured to control a component different from the variable stem in accordance with the information.

With the variable stem according to the fourteenth aspect, it is possible to customize of the state of a component in accordance with information relating to a state of the variable stem.

In accordance with a fifteenth aspect of the present disclosure, the variable stem according to the fourteenth aspect is configured so that the electronic controller is configured to control the component in accordance to a position of the variable stem as the state of the variable stem.

With the variable stem according to the fifteenth aspect, it is possible to customize of the state of a component in accordance with the position of the variable stem.

In accordance with a sixteenth aspect of the present disclosure, the variable stem according to the fourteenth or fifteenth aspect is configured so that the component includes at least one of a suspension, a height adjustable seatpost, a shifting device, a braking system, an assist unit, a lamp, and a cycle computer.

With the variable stem according to the sixteenth aspect, it is possible to customize of the state of at least one of a suspension, a height adjustable seatpost, a shifting device, a braking system, an assist unit, a lamp, and a cycle computer in accordance with the position of the variable stem.

Also, other objects, features, aspects and advantages of the disclosed variable stem will become apparent to those skilled in the art from the following detailed description, which, taken in conjunction with the annexed drawings, discloses preferred embodiments of the variable stem.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
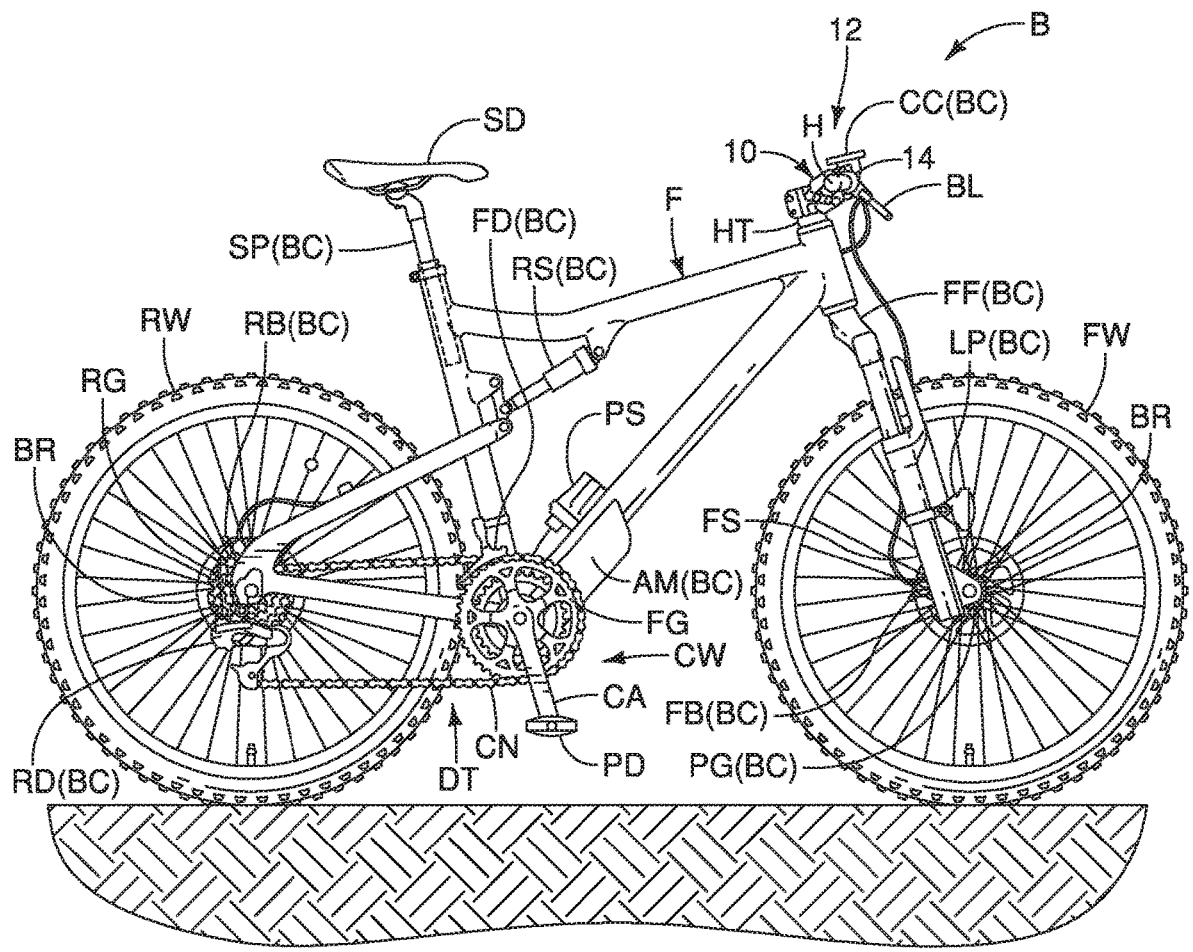
FIG. 1 is a side elevational view of a bicycle (i.e., a human-powered vehicle) that is equipped with a variable stem in accordance with a first embodiment.
Figure 2:
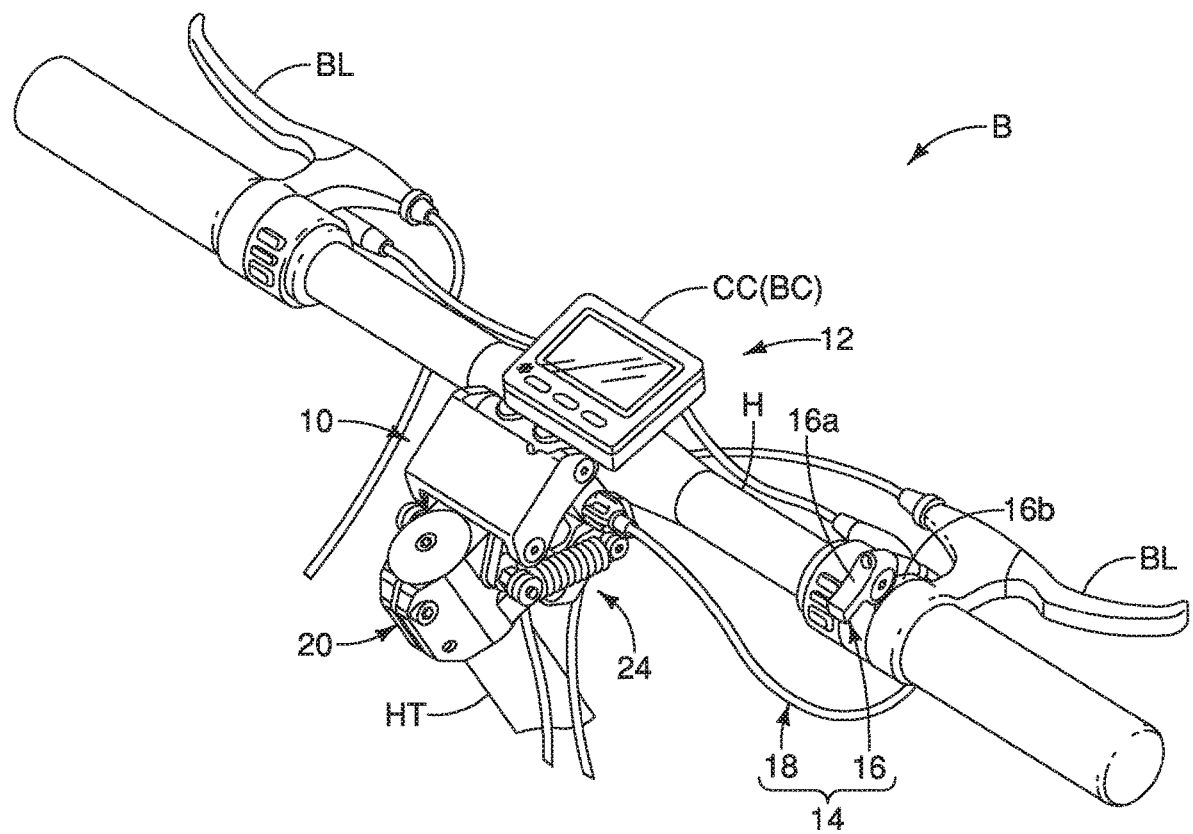
FIG. 2 is a partial perspective view of a handlebar area of the bicycle illustrated in FIG. 1 having the variable stem and a user operated input.
Figure 3:
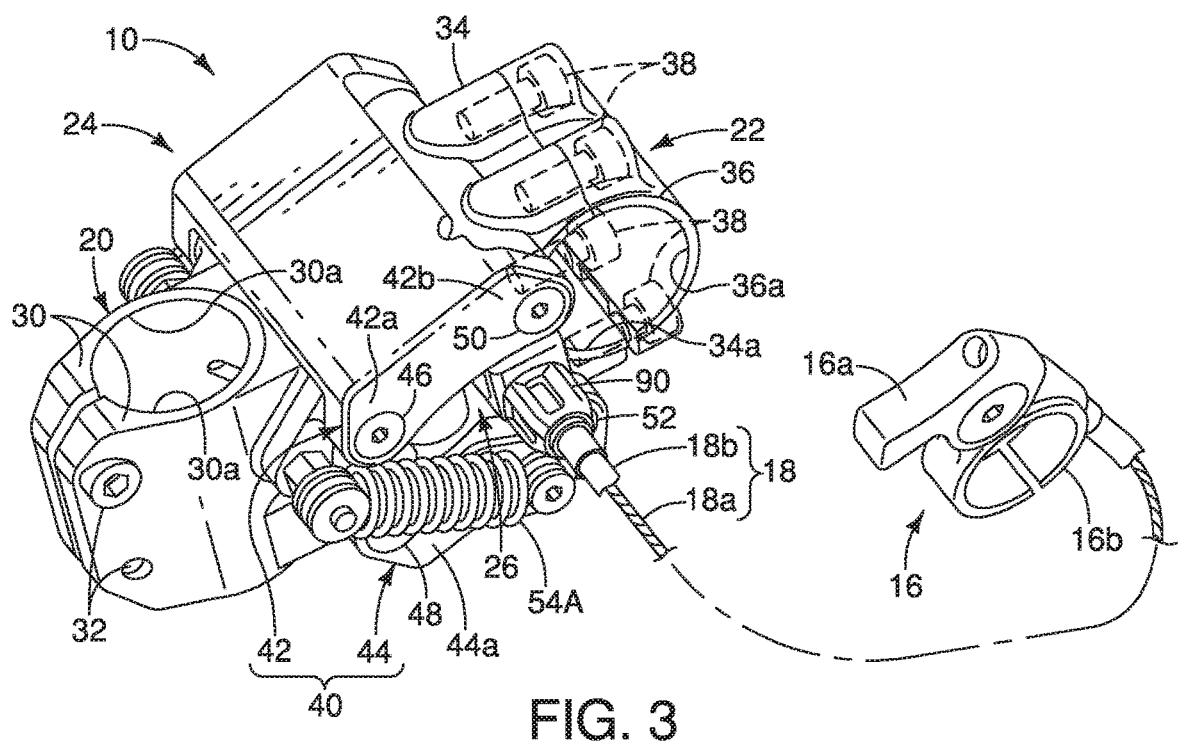
FIG. 3 is a perspective view of the variable stem and the user operated input the illustrated in FIGS. 1 and 2 with the variable stem in a first stem position.
Figure 4:
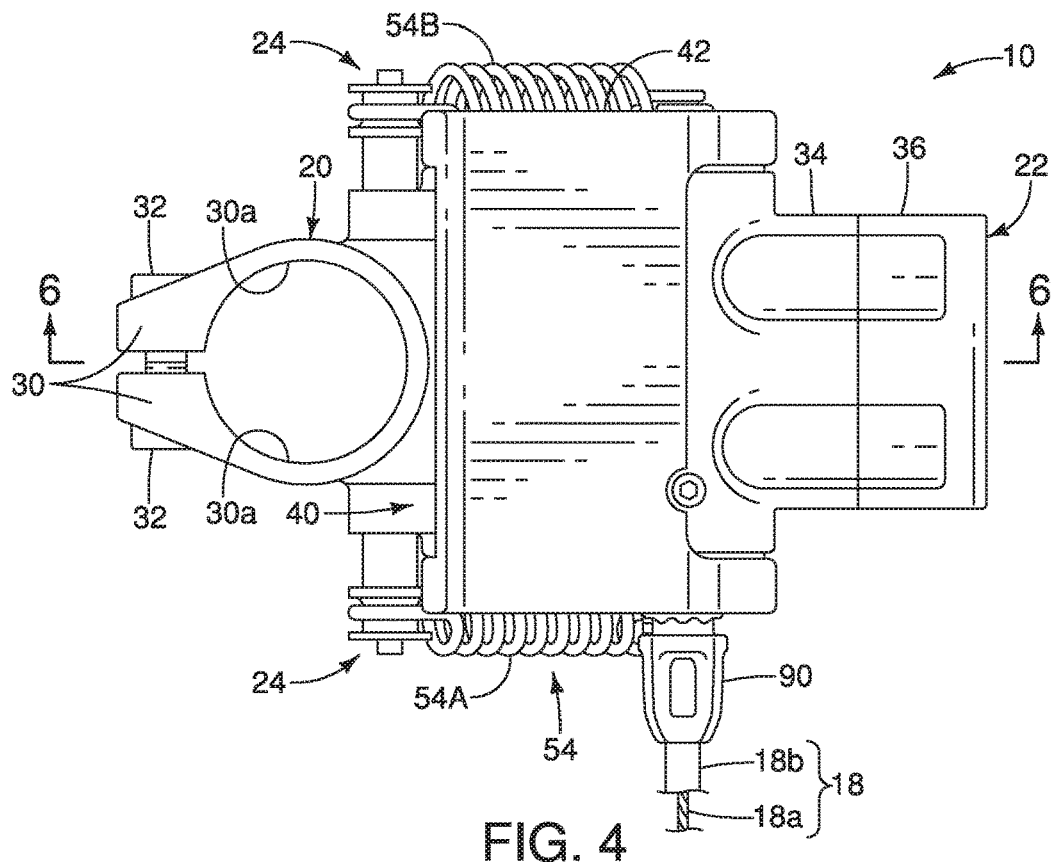
FIG. 4 is a top view the variable stem illustrated in FIGS. 1 to 3 as viewed parallel to the head tube axis.
Figure 5:
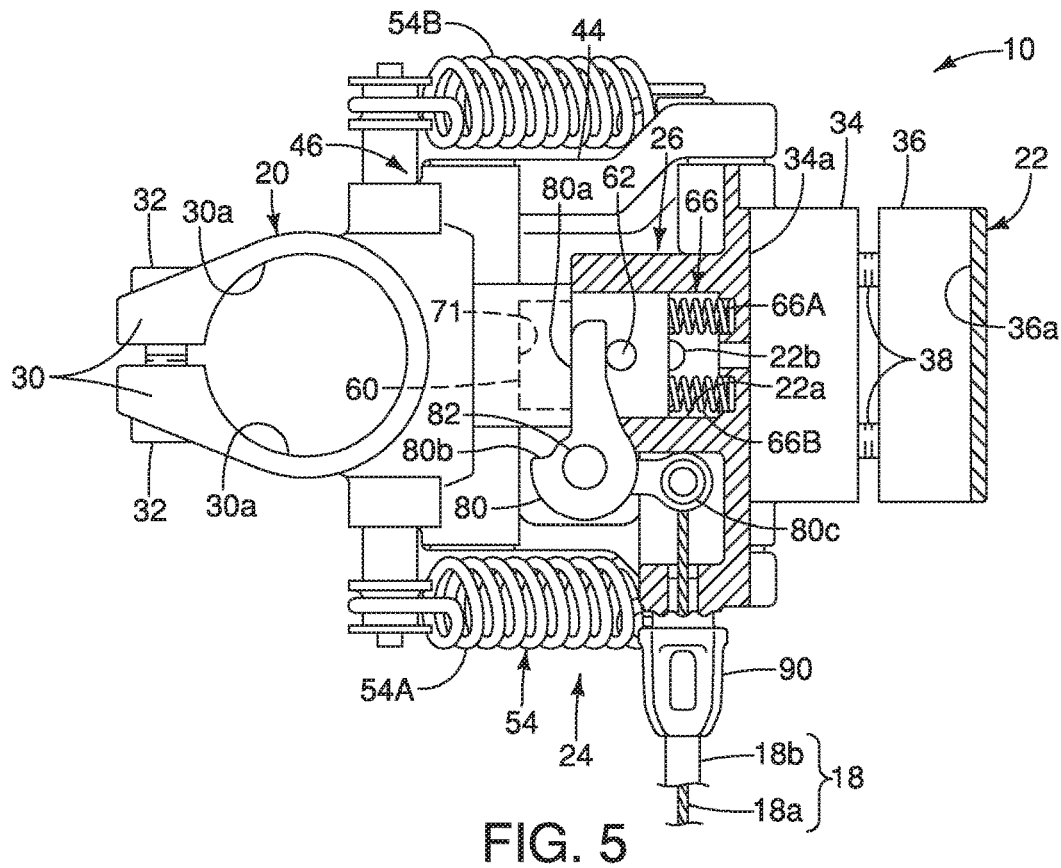
FIG. 5 is a top view, similar to FIG. 4, of the variable stem illustrated in FIGS. 1 to 4 but with a portion broken away for purposes of illustration.
Figure 6:
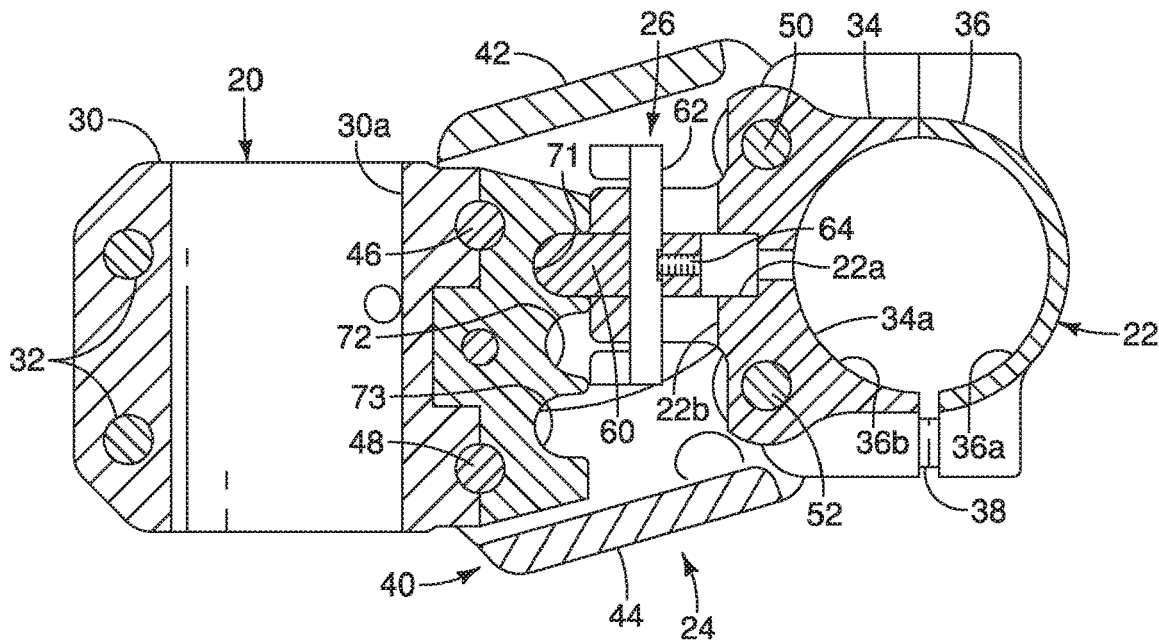
FIG. 6 is a cross sectional view of the variable stem illustrated in FIGS. 1 to 5 as seen along section line 6-6 of FIG. 4 with a movable member of the variable stem engaged with a first recess of a head tube mount of the variable stem to establish a first stem position of the variable stem.
Figure 7:
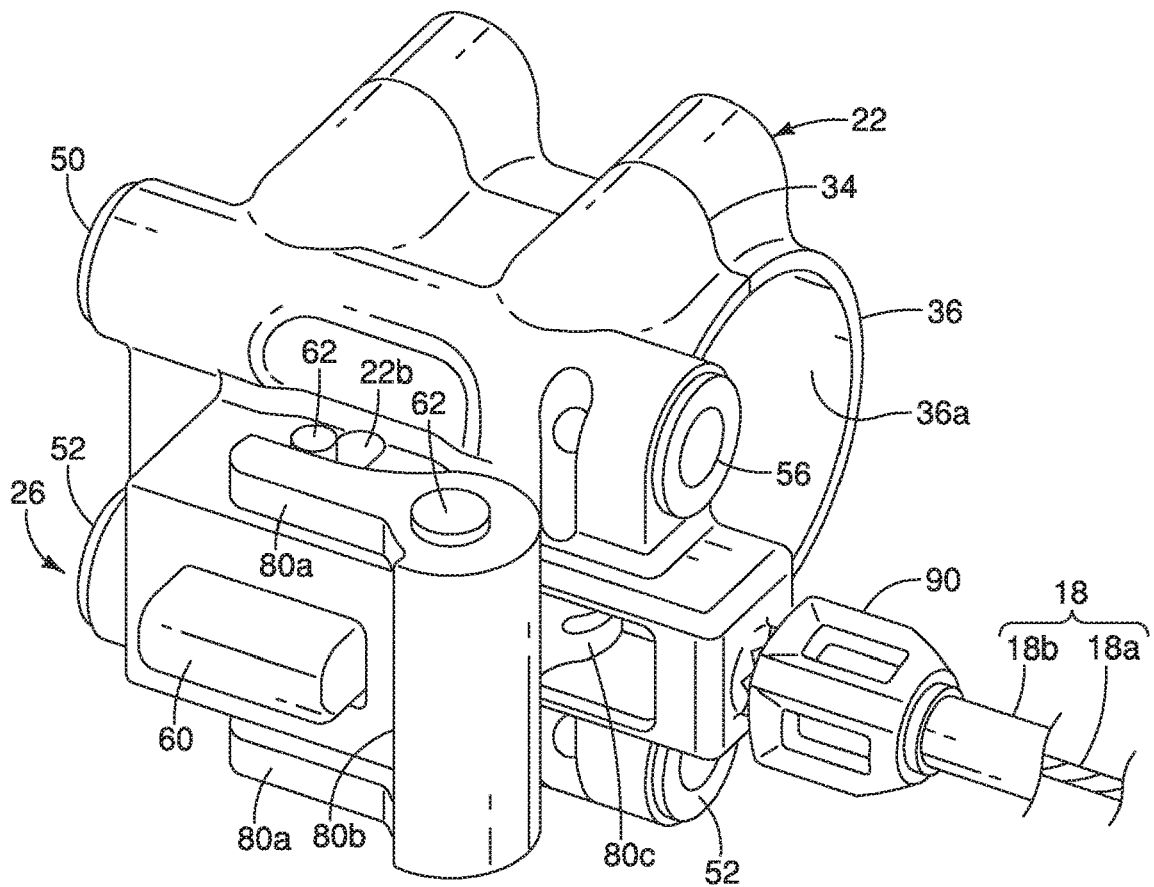
FIG. 7 is a perspective view of selected parts of the variable stem illustrated in FIGS. 1 to 6 with the variable stem in a first stem position.
Figure 8:
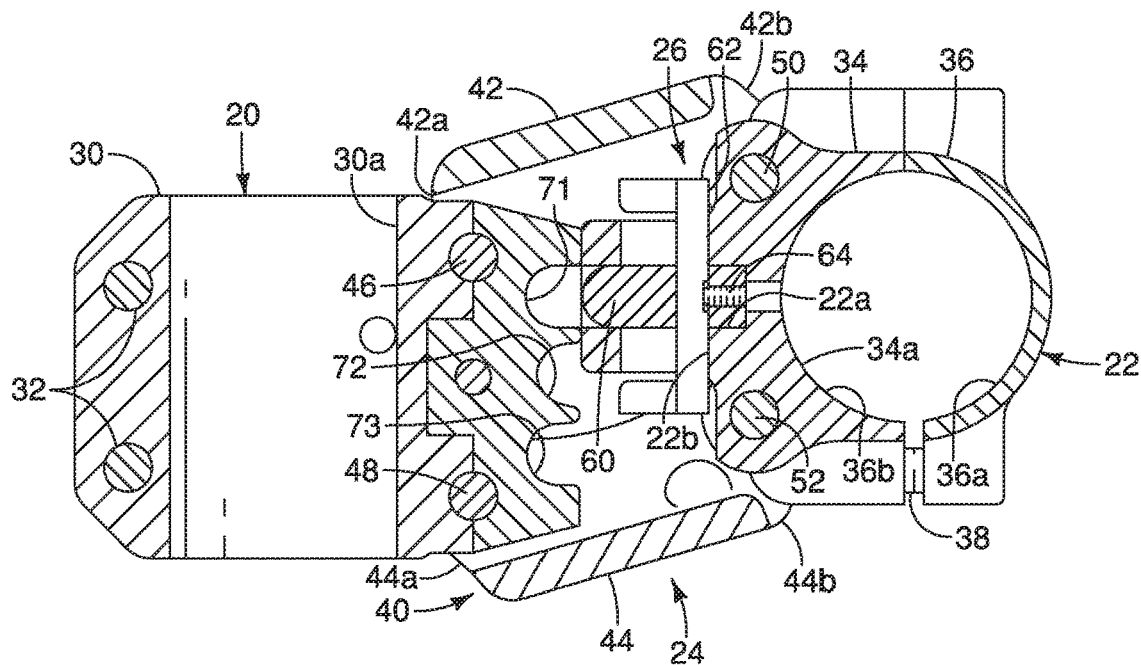
FIG. 8 is a cross sectional view, similar to FIG. 6, of the variable stem illustrated in FIGS. 1 to 7 but with the movable member of the variable stem disengaged from the first recess of the head tube mount for adjusting the variable stem.
Figure 9:
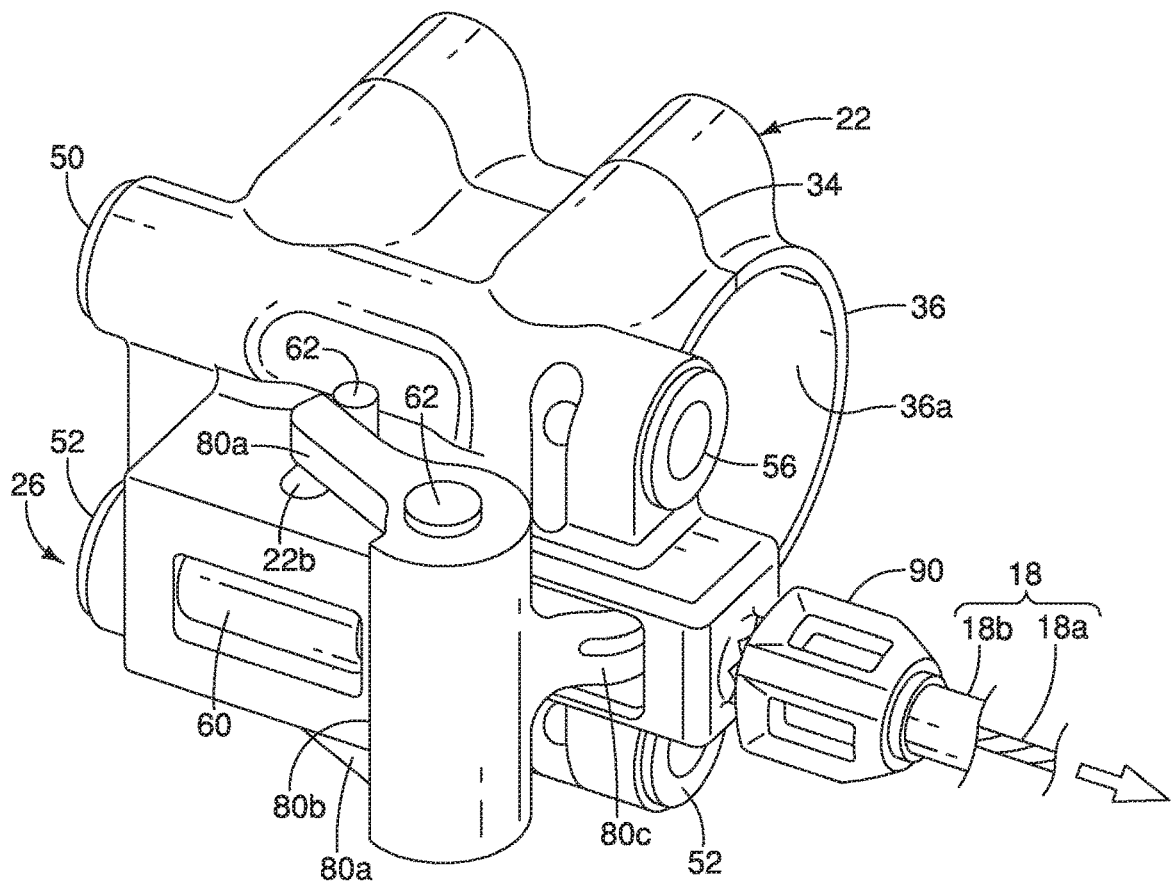
FIG. 9 is a perspective view, similar to FIG. 7, of selected parts of the variable stem illustrated in FIGS. 1 to 7 but with the movable member of the variable stem disengaged from the first recess of the head tube mount for adjusting the variable stem.
Figure 10:
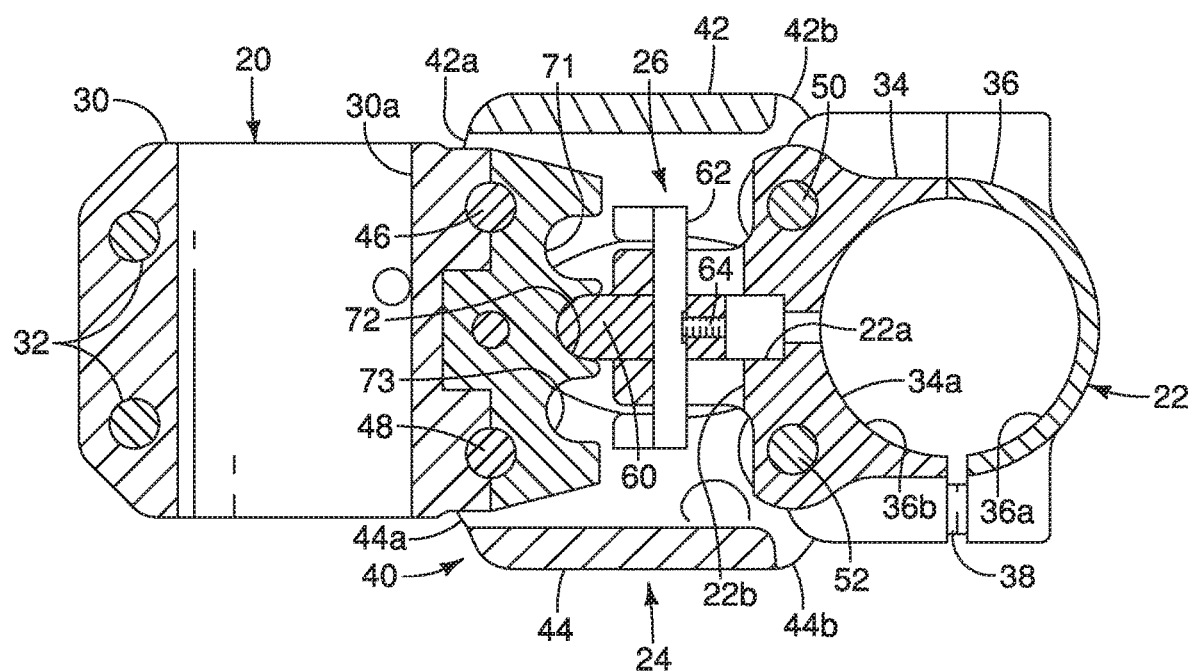
FIG. 10 is a cross sectional view, similar to FIG. 6, of the variable stem illustrated in FIGS. 1 to 7 with the movable member engaged with a second recess of the head tube mount of the variable stem to establish a second stem position of the variable stem.
Figure 11:
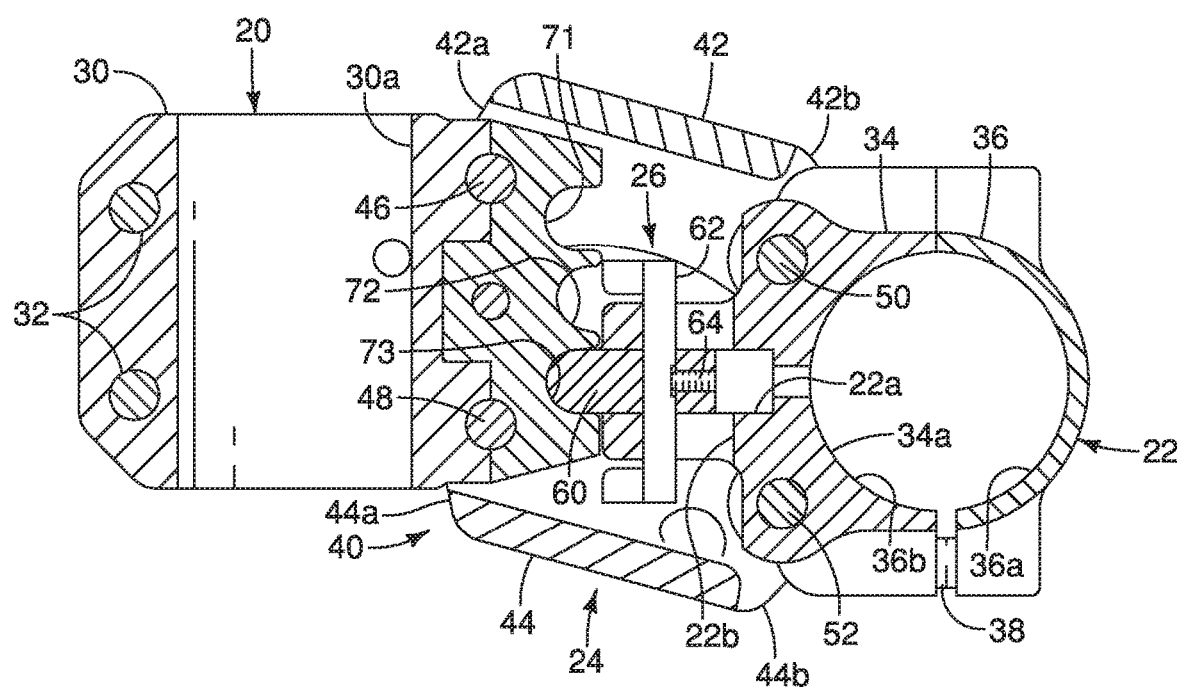
FIG. 11 is a cross sectional view, similar to FIGS. 6 and 10, of the variable stem illustrated in FIGS. 1 to 7 with the movable member engaged with a third recess of the head tube mount of the variable stem to establish a third stem position of the variable stem.

Referring initially to FIG. 1, a human-powered vehicle B is illustrated that is equipped with a variable stem 10 in accordance with a first illustrated embodiment. A human-powered vehicle as used herein refers to a vehicle that at least partially uses human power as driving power for travelling and includes a vehicle electrically assisting human power. The human-powered vehicle does not include a vehicle using only driving power other than human power. In particular, a vehicle using solely an internal combustion engine as driving power is not included in the human-powered vehicle of this disclosure. The human-powered vehicle is generally assumed to be a compact, light vehicle that does not require a license for driving on a public road. The human-powered vehicle B shown in the drawings is one example of a human-powered vehicle that is equipped with the variable stem 10 in accordance with the illustrated embodiment.

The human-powered vehicle B includes a frame F, a front fork FF, a front wheel FW, a rear wheel RW, a handlebar H and a drivetrain DT.

The drivetrain DT includes a crank assembly CW, a front sprocket FG, a rear sprocket RG and a chain CN. The crank assembly CW includes a pair of crank arms CA (only one shown), a crankshaft (not shown) and a pair of pedals PD (only one shown). The crank arms CA are mounted at opposite ends of the crankshaft. Each of the pedals PD is rotatably coupled to the distal end of a corresponding one of the crank arms CA.

The front sprocket FS is arranged on the crank assembly CW. The rear sprocket RG is arranged on a rear hub HA of the rear wheel RW. In one example, the chain CN runs around the front sprocket FG and the rear sprocket RG. A driving force applied by the rider of the human-powered vehicle B to the pedals PD is transmitted via the front sprocket FG, the chain CN, and the rear sprocket RG to the rear wheel RW.

The human-powered vehicle B further includes various components BC. Since the human-powered vehicle B is a bicycle in the illustrated embodiment, the components BC are bicycle components in the illustrated embodiment. Here, the components BC includes an electric front derailleur FD, an electric rear derailleur RD, a travel assist motor AM, a front suspension FS, a rear suspension RS, an adjustable seatpost SP, a front brake device FB, a rear brake device RB, a cycle computer CC, a power generator PG and a lamp LP. Each of the components BC receives electrical power that is supplied from a main battery PS mounted on the human-powered vehicle B and/or a dedicated power supply (not shown) mounted on the component BC. In one example, the main battery PS is arranged on an outer surface of the frame F. At least part of the main battery PS can be arranged in the inner cavity of the frame F.

The front derailleur FD and rear derailleur RD are examples of shifting devices. The front derailleur FD is arranged on a seat tube of the frame F. The rear derailleur RD is arranged on a rear end of the frame F. The travel assist motor AM functions to assist in propulsion force of the human-powered vehicle B. The front suspension FS functions to dampen impacts that the front wheel FW receives from the ground. The rear suspension RS functions to dampen impacts that the rear wheel RW receives from the ground. The adjustable seatpost SP functions to change the height of a saddle SD with respect to the frame F. The front and rear brake devices FB and RB are each a disc brake device that is configures to apply a braking force to a disc brake rotor BR. The brake rotors BR are arranged on the front wheel FW and the rear wheel RW, respectively. The front and rear brake devices FB and RB apply a braking force the rotary bodies BR in accordance with operation input into brake operating devices BL coupled to the handlebar H. The power generator PG includes at least one of a hub dynamo, a block dynamo, an assist regeneration mechanism, and a vibration power-generating element. The cycle computer CC is arranged, for example, on the handlebar H. The cycle computer CC provides information about the driving state of the human-powered vehicle B, and a state of the components BC. The lamp LP is arranged, for example, on the front fork FF. The lamp LP illuminates the rides path.

Here, as seen in FIG. 1, the human-powered vehicle B includes a component control system 12 that comprises the variable stem 10. In the first embodiment, the component control system 12 is a manual component control system that is physically operated by a rider while the human-powered vehicle B is in a driving state. Here, in the first embodiment, the variable stem 10 comprises a controller 14. The term "controller" as used herein refers to both a manually operated device and an automatically controlled device that operates one or more of the component BC. As used herein, the term "controller" does not include a human. Thus, term "controller" includes a mechanical controller as well as includes an electronic controller. In the first embodiment, the controller 14 is a manually operated device as discussed below. Specifically, the controller 14 includes an operating device 16 and a control cable 18. The control cable 18 is a Bowden cable that includes an inner wire 18 and an outer case 18b. The inner wire 18 is slidably disposed inside the outer case 18b. The operating device 16 includes a user operated input 16a and a handlebar attachment 16b. Here, the user operated input 16a is a lever that is pivotally mounted to the handlebar attachment 16b. The inner wire 18a of the cable 18 is attached to the user operated input 16a. Thus, the variable stem 10 is mechanically operated by the cable 18.

In the first embodiment, the variable stem 10 basically comprises a head tube mount 20, a handlebar mount 22, a stem body 24 and a positioning structure 26. Basically, the head tube mount 20 is configured to be mounted to a steerer tube or head tube HT of the front fork FF, while the handlebar mount 22 is configured to be mounted to the handlebar H. The stem body 24 couples the handlebar mount 22 to the head tube mount 20. In this way, the variable stem 10 is rigidly mounted to the head tube HT of the front fork FF and supports the handlebar H for turning the front fork FF and the front wheel FW with respect to the frame F.

The controller 14 is configured to control the positioning structure 26 while the human-powered vehicle B is in a driving state. Specifically, the controller 14 controls the positioning structure 26 to change the position of the handlebar H with respect to the frame F. More specifically, the controller 14 controls the positioning structure 26 to change the height of the handlebar H with respect to the frame F.

The tube mount 20 is movably supports a first end of the stem body 24 as discussed below. The head tube mount 20 is a tube clamp having a pair of jaws 30 and a pair of bolts 32. Here, the jaws 30 are integrally formed as one-piece, but could be pivotally connected together at one end. Each of the jaws 30 has curved internal surface 30a that contacts a corresponding curved external surface of the head tube HT. As the bolts 32 are tightened, the bolts 32 squeeze the free ends of the jaws 30 together to tightly grasp the head tube HT.

The handlebar mount 22 is movably supported at a second end of the stem body 24. The handlebar mount 22 is a tube clamp having a first clamp part 34, a second clamp part 36 and four bolts 38. The first clamp part 34 is movably coupled to the stem body 24 as discussed below. The second clamp part 36 is attached to the first clamp part 34 by the bolt 38. The first clamp part 34 has curved internal surface 34a that contacts a corresponding curved external surface of the handlebar H. The second clamp part 36 as curved internal surface 36a that contacts a corresponding curved external surface of the handlebar H. As the bolts 38 are tightened, the bolts 38 clamps the handlebar H between the first and second clamp parts 34 and 36.

As mentioned above, the stem body 24 interconnects the head tube mount 20 and the handlebar mount 22 such that the position of the handlebar H with respect to the frame F can be changed in response to operation of the controller 14 that is operatively coupled to the positioning structure 26. Basically, the stem body 24 is configured to be moved between a first position and a second position. The positioning structure 26 is configured to selectively position the stem body 24 between the first position and the second position. Here, the positioning structure 26 is configured to selectively position the stem body 24 in a third position. The third position is arranged between the first position and the second position. In other words, here, the stem body 24 is configured to be moved between three different positions for selectively supporting the handlebar H at three different heights with respect to the frame F. In other words, here, the stem body 24 is configured to be moved between a third position and either of the first and second positions.

Depending on the riding conditions, different handlebar positions are often desired by the rider which is related to the stem position the variable stem 10. Thus, it is desirable to be able to set different handlebar positions for different riding conditions. Here, in the first embodiment, the first position of the stem body 24 is the highest stem position for providing a high handlebar setting. The second position of the stem body 24 is the lowest stem position for providing a low handlebar setting. The third position of the stem body 24 is a middle stem position for providing a normal or middle handlebar setting. The stem body 24 is preferably set to the first position when descending on an inclined surface to provide better tire grip of the rear wheel RW. Also, sometimes by setting the stem body 24 to the first position, the rider can be better positioned for improve aerodynamics during riding. On the other hand, the stem body 24 is preferably set to the second position when climbing on an inclined surface to provide better tire grip of the front wheel FW. The stem body 24 is preferably set to the third position when travelling on a substantially level surface. Here, for example, a substantially level surface includes an inclination of ±ten degrees form level.

Accordingly, with the variable stem 10, the handlebar mount 22 is disposed at a different location with respect to the head tube mount 20 with the stem body 24 in the first position as compared to the stem body 24 being in the second position. Likewise, the handlebar mount 22 is disposed at a different location with respect to the head tube mount 20 with the stem body 24 in the third position as compared to the stem body 24 being in either the first position or the second position. In other words, the handlebar mount 22 is disposed at different locations with respect to the head tube mount 20 with the stem body 24 is in each of the first, second and third positions. While, the stem body 24 can be selectively disposed in three different positions, the variable stem 10 can be modified to have only two stem positions or more than three stem positions.

Here, the stem body 24 includes a linkage 40 interconnecting the head tube mount 20 and the handlebar mount 22. For example, in the first embodiment, the linkage 24 includes a first link 42 and a second link 44. The first link 42 has a first end 42a pivotally coupled to the head tube mount 20 and a second end 42b pivotally coupled to the handlebar mount 22. Similarly, the second link 44 has a first end 44a pivotally coupled to the head tube mount 20 and a second end 44b pivotally coupled to the handlebar mount 22. Specifically, the first end 42a of the first link 42 is pivotally coupled to the head tube mount 20 by a pair of bolts 46 that are fastened to the head tube mount 20. The first end 44a of the second link 44 is pivotally coupled to the head tube mount 20 by a pair of bolts 48 that are fastened to the head tube mount 20. The second end 42b of the first link 42 is pivotally coupled to the handlebar mount 22 by a pair of bolts 50 that are fastened to the handlebar mount 22. The second end 44b of the second link 44 is pivotally coupled to the handlebar mount 22 by a pair of bolts 52 that are fastened to the handlebar mount 22.

Preferably, the stem body 24 is biased towards one of the first position and the second position. For example, the variable stem 10 further comprises a biasing element 54 (e.g., a spring) that biases the stem body 24 towards the first position. Here, the biasing element 54 includes a pair of coiled tension springs 54A and 54B as shown or any other suitable spring. One end of each of the springs 54A and 54B is attached to the head tube mount 20 and the other end of each of the springs 54A and 54B is attached to the second link 44. However, the variable stem 10 is not limited to this biasing arrangement. Also, the springs 54A and 54B can be omitted if desired.

In the first embodiment, the positioning structure 26 includes a movable member 60. The movable member 60 is movably coupled to the handlebar mount 22, and is engaged with the head tube mount 20 in the rest position. The movable member 60 is slidably disposed in a first slot 22a of the handlebar mount 22. The movable member 60 is retained in the first slot 22a of the handlebar mount 22 by a control pin 62 that is located in a second slot 22b of the handlebar mount 22. The control pin 62 is fixed to the movable member 60 by a set screw 64. Preferably, for example, a biasing element 66 (e.g., a spring) is disposed between the handlebar mount 22 and the movable member 60 to bias the movable member 60 towards engagement with the head tube mount 20. The biasing element 66 can be a pair of compression springs 66A and 66B as shown or any other suitable spring.

Here, the movable member 60 is a latch that selectively engages one of a plurality of recesses 71, 72 and 73 of the head tube mount 20. The movable member 60 engages the first recess 71 of the head tube mount 20 to retain the stem body 24 in the first position. The movable member 60 engages the second recess 72 of the head tube mount 20 to retain the stem body 24 in the third position. The movable member 60 engages the third recess 73 of the head tube mount 20 to retain the stem body 24 in the second position. Here, the recesses 71, 72 and 73 are formed in a positioning block 74 that is attached to the head tube mount 20 by a fastener 76. Alternatively, the recesses 71, 72 and 73 can be formed directly in the head tube mount 20. When a rider wants to adjust the height of the handlebar H, the rider operates the controller 14 to disengage the movable member 60 from the head tube mount 20.

While the movable member 60 is shown as being movably coupled to the handlebar mount 22, the variable stem 10 is not limited to this configuration. Rather, it will be apparent from this disclosure that the positioning structure 26 can be reversed with respect to the head tube mount 20 and the handlebar mount 22. In other words, the movable member 60 is movably coupled to one of the head tube mount 20 and the handlebar mount 22. The movable member 60 is engaged to one of the head tube mount 20 and the handlebar mount 22 in the rest position. The movable member 60 is disengaged from the one of the head tube mount 20 and the handlebar mount 22 in the operated position.

In the first embodiment, the controller 14 includes a driver 80 that configured to move the movable member 60 between the rest position and the operated position. The driver 80 is pivotally mounted to the handlebar mount 22 by a pivot pin 82. The driver 80 includes a pair of abutments 80a that contact opposite ends of the control pin 62. The driver 80 further includes a stop 80b abuts against the handlebar mount 22 in the rest position due to the force of the springs 66A and 66B.

Here, the driver 80 includes a cable holder 80c that is configured to hold the cable 18 extending from the operating device 16. When the inner wire 18a of the cable 18 is pulled by the user operated input 16a of the operating device 16, the abutments 80a push the control pin 62 to move the movable member 60 from the engaged (latched) position to the disengaged (unlatched) position. Preferably, the variable stem 10 further comprises a cable barrel adjuster 90 that is mounted to the handlebar mount 22. However, the driver 80 is not limited to the illustrated embodiment. Rather, the driver 80 can be another type of movable structure (e.g., a claw pawl, an actuator comprising shape-memory alloy, etc.).

Now, the changing the position of the stem body 24 to change the handlebar height will be briefly discussed. When the position of the stem body 24 corresponds to the first (top) position, the rider pushes the user operated input 16a to disengage the movable member 60 from the head tube mount 20. While holding down the user operated input 16a, the rider pushes the handlebar H down against the biasing force of the springs 54A and 54B to the desired height (the second or third position). Once the handlebar H is at the desired height, the rider releases the user operated input 16a so that the movable member 60 engages one of the recesses 72 and 73 of the head tube mount 20 to establish the new position of handlebar H.

When the position of the stem body 24 corresponds to the second (low) position, the rider pushes the user operated input 16a to disengage the movable member 60 from the head tube mount 20. While holding down the user operated input 116a, the biasing force of the springs 54A and 54B will move the handlebar H upward to the desired height. Once the handlebar H is at the desired height (the first or third position), the rider releases the user operated input 16a so that the movable member 60 engages one of the recesses 71 and 72 of the head tube mount 20 to establish the new position of handlebar H.

Figure 12:
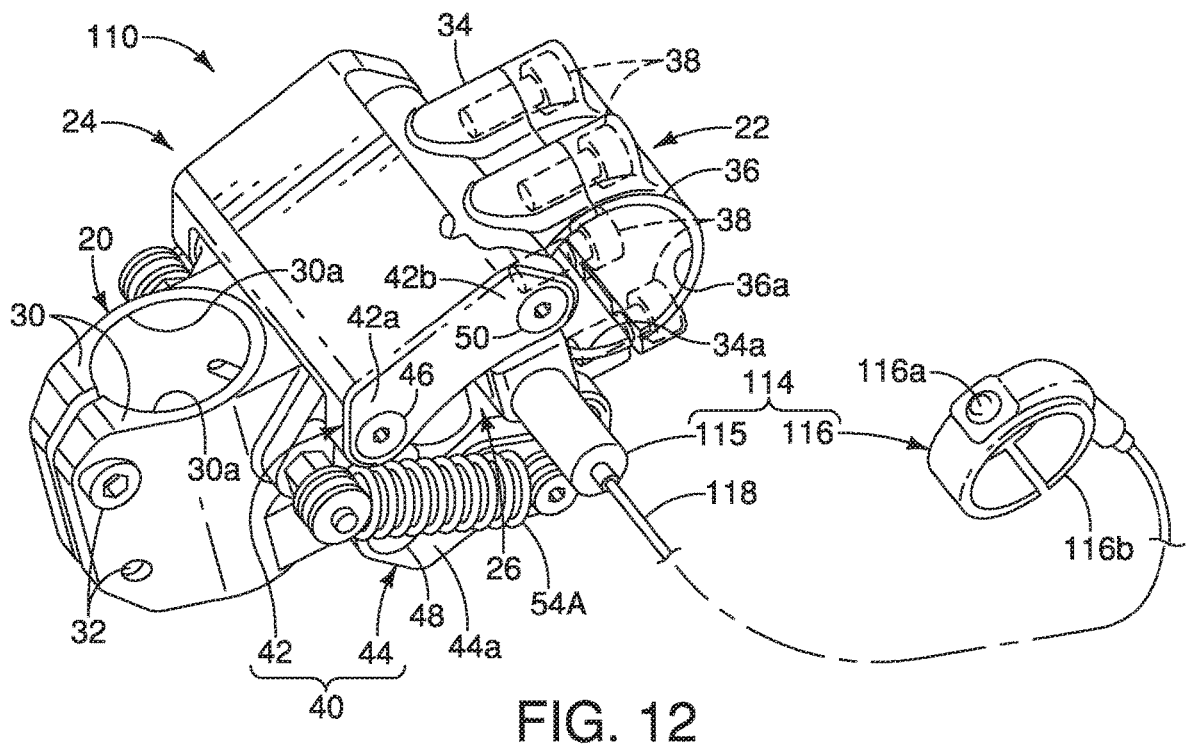
FIG. 12 is a perspective view of a variable stem and a user operated input in accordance with a second embodiment with the variable stem in the first stem position.
Figure 13:
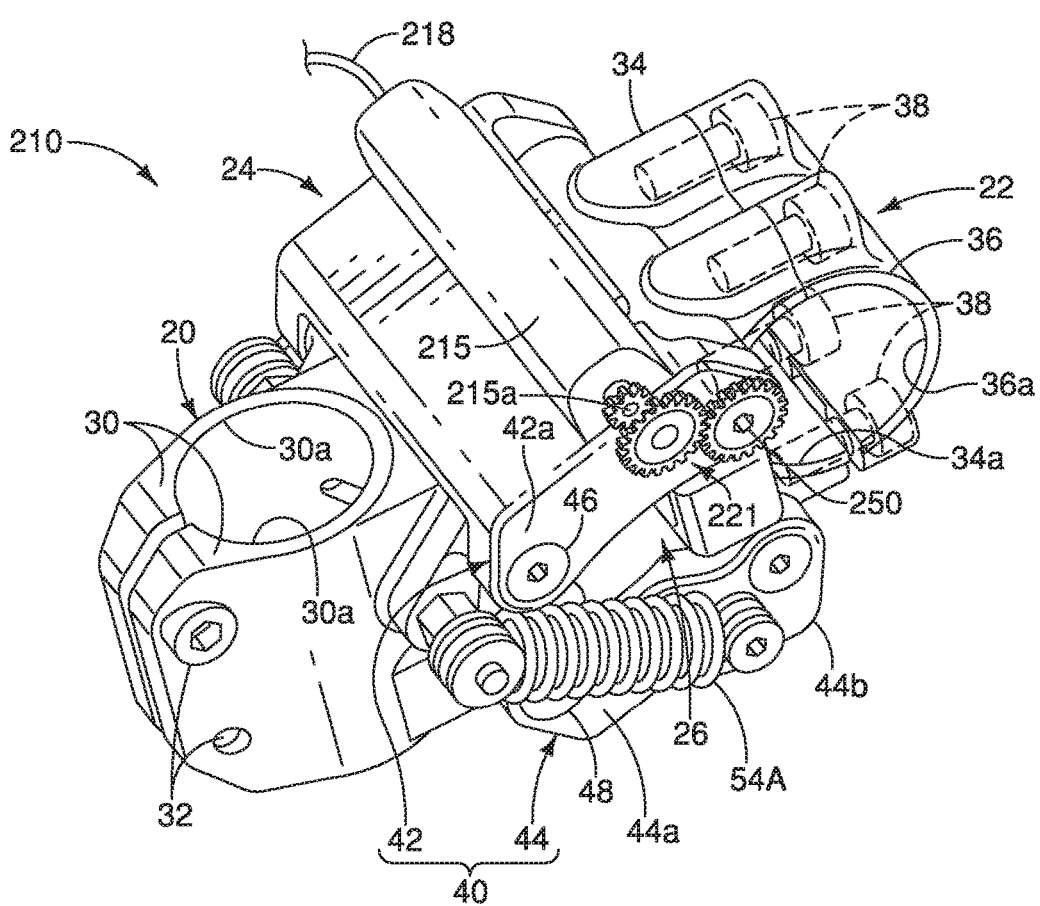
FIG. 13 is a perspective view of a variable stem and a user operated input in accordance with a third embodiment with the variable stem in the first stem position.

Referring now to FIG. 12, a variable stem 110 is illustrated in accordance with a second embodiment. The variable stem 110 is identical to the variable stem 10, except that the controller 14 has been replaced with a controller 114. Basically, the variable stem 110 basically comprises the head tube mount 20, the handlebar mount 22, the stem body 24 and the positioning structure 26 of the first embodiment. Thus, the parts of the variable stem 110 that are the same as the parts of the variable stem 10 will be given the same reference symbol and will not be discussed again in the second embodiment.

Here, the controller 114 further includes an electric actuator 115 that is configured to activate the driver 80. The electric actuator 115 can be for example an electric solenoid. Alternatively, the electric actuator 115 can be an electrical motor. The controller 114 further includes an operating device 116 and an electrical cord 118. The operating device 116 includes a user operated input 116a and a handlebar attachment 116b. Here, the user operated input 116a is a push button type of electrical switch. Of course, the user operated input 116a is not limited to a push button type as shown, but rather can also be a toggle type, a lever-like or any other suitable input structure of an electrical switch. The user operated input 116a is electrically connected to the electric actuator 115 by the electrical cord 118. In this way, the electric actuator 115 is activated when a rider pushes the user operated input 116a. The electric actuator 115 then pivots the driver 80 which in turn disengages the movable member 60 so that the handlebar mount 22 can be adjusted with respect to the head tube mount 20.

Figure 14:
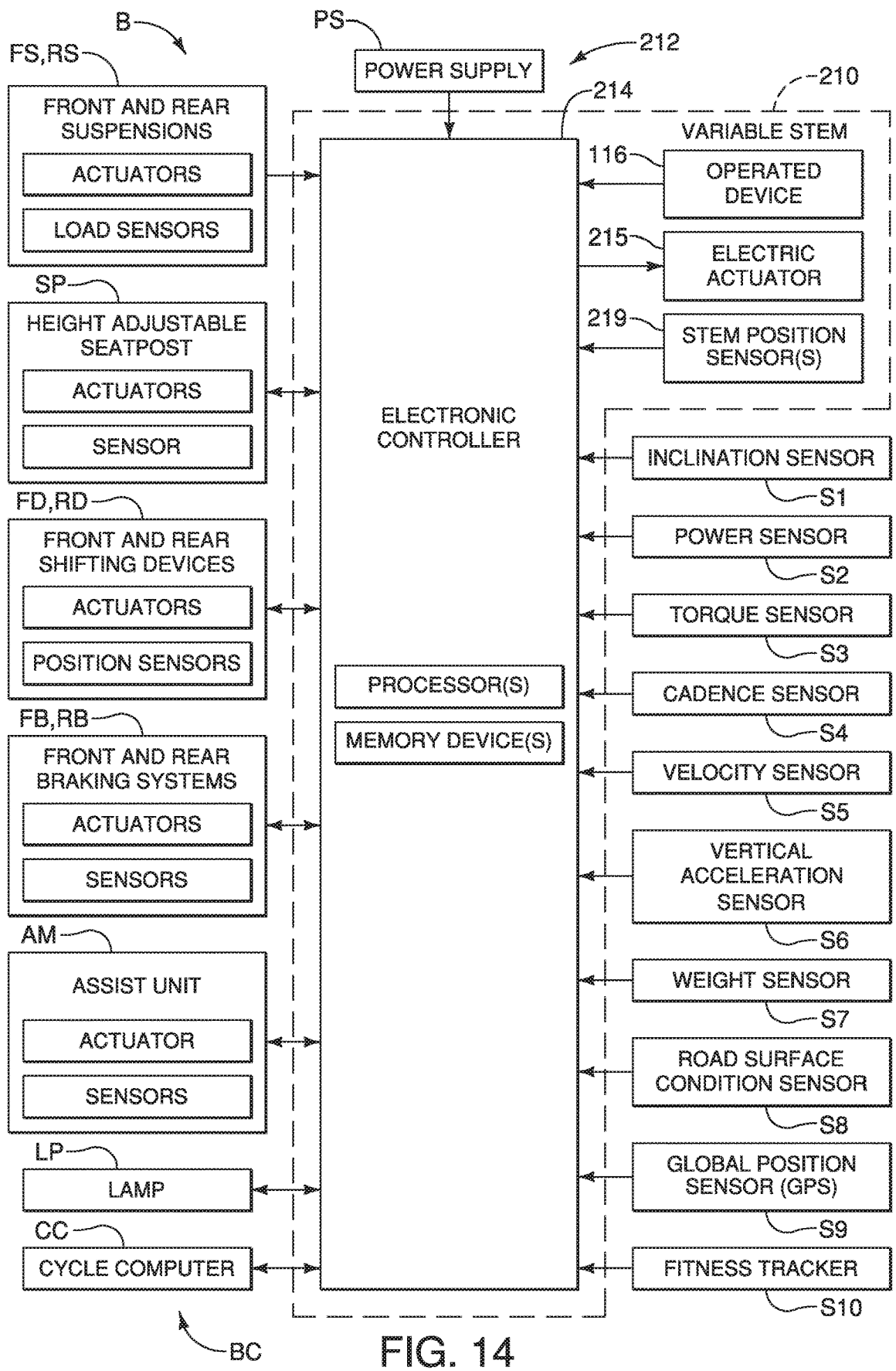
FIG. 14 is a schematic view of a component control system comprises the variable stem of FIG. 13 in accordance with the third embodiment.

Referring now to FIGS. 13 to 20, a variable stem 210 is illustrated in accordance with a third embodiment. Here, as seen in FIG. 14, the human-powered vehicle B includes a component control system 212 that comprises the variable stem 210. In the third embodiment, the component control system 212 is both a manual component control system in which the variable stem 210 can be manually operated by a rider while the human-powered vehicle B is in a driving state, and in which the variable stem 210 can be automatically operated by a rider based on a driving state of the human powered-vehicle B. Also, in this third embodiment, the variable stem 210 can be automatically adjusted based on a driving state of the human powered-vehicle B, or the one or more of the components BC can be controlled based on the variable stem 210 being manually adjusted by the rider. In either case, the variable stem 210 is electrically operated as explained below.

Here, the variable stem 210 includes many of the same parts as the variable stem 10 of the first and second embodiments. In particular, the variable stem 210 basically comprises the head tube mount 20, the handlebar mount 22 and the stem body 24 of the first embodiment. Thus, the parts of the variable stem 210 that are the same as the parts of the variable stem 10 or 110 will be given the same reference symbol and will not be discussed again in the third embodiment.

In this third embodiment, the variable stem 210 comprises an electronic controller 214 and an electric actuator or motor 215 for controlling the positions of the variable stem 210. As seen in FIG. 14, the variable stem 210 further comprises the operating device 116 which is electrically connected to the electric motor 215 by an electrical cord 218. In this way, the variable stem 210 includes a manually operated controller (the operating device 116 and the electrical cord 218, which form a physically operated controller) for the user to manually control the positions of the variable stem 210 via the electric motor 215. The electronic controller 214 is also electrically connected to the electric motor 215 by the electrical cord 218. In this way, the electronic controller 214 is configured to automatically control the positions of the variable stem 210 via the electric motor 215 as explained below.

Thus, in the third embodiment, the variable stem 210 includes the stem body 24 of the first embodiment, except that cable actuated controller has been replaced with an electric actuated controller that includes the electric motor 215. In case in which an electric actuator (e.g. an electric motor) to adjust the position of the stem body 24, the recess structure of the stem body 24 can be omitted. Moreover, the linkage can be substituted with a pinion and rack structure that is driven by an electric actuator (e.g. an electric motor) to change the stem position in a stepless or infinite number of positions between the first and second stem body positions.

The component control system 212 further comprises at least one sensor configured to detect information relating to a state of the variable stem 210. The electronic controller 214 is configured to control a component (e.g., at least one of the components BC) that different from the variable stem 10 in accordance with the information relating to a state of the variable stem 210. In the third embodiment, the variable stem 210 further comprises at least one sensor 219 that is arranged to detect a current position (e.g., a state) of the stem body 24. More specifically, in the third embodiment, the variable stem 210 can include a single rotation sensor as the sensor 219 that measures directly or indirectly a rotation of the output shaft of the electric motor 215. For example, the sensor 219 can be a potentiometer that includes a stationary electrical contact plate and a movable electrical brush plate. Alternatively, for example, the sensor 219 can be an intermittent optical sensor that includes a shutter wheel operatively connected to the output shaft of the electric motor 215 and a dual channel photo interrupter having a light source or LED disposed on one side of the shutter wheel and a light detector such as a phototransistor disposed on the other side of the shutter wheel. output shaft 62*a*. In any case, the sensor 219 outputs an analog or mechanical position signal that is sent to the electronic controller 214 to indicate the current position of the stem body 24. The sensor 219 can transmit the position signal to the electronic controller 214 via wireless or wired communications.

On the other hand, if the electric motor 215 is omitted in the third embodiment and the cable operated controller 14 is used in conjunction with the electronic controller 214, then the variable stem 210 can comprises three sensors for detecting the current position of the stem body 24. For example, in the case of the cable operated controller 14 being used in conjunction with the electronic controller 214, the three sensors 219 are contact or pressure sensors in which one of the sensors 219 is located in each of the recesses 71, 72 and 73. In this way, the sensors 219 can detect the current position of the stem body 24 by detecting the engagement of the movable member 60 with one of the recesses 71, 72 and 73. The sensors 219 outputs a position signal to provide the electronic controller 214 with a current position (e.g., a state) of the stem body 24. The sensors 219 can communicate the data signal with the electronic controller 214 via wireless or wired communications.

In the case in which the electronic controller 214 controls one or more of the components BC based on information relating to a state of the variable stem 210, the position of the stem body 24 of the variable stem 210 can be changed by the rider activating the electric motor 215 using the operating device 116. Alternatively, in the case in which the electronic controller 214 controls one or more of the components BC based on information relating to a state of the variable stem 210, the position of the stem body 24 of the variable stem 210 can be changed by the rider using the operating device 16 of the first embodiment. Also, alternatively, in the case in which the electronic controller 214 controls one or more of the components BC based on information relating to a state of the variable stem 210, the position of the stem body 24 of the variable stem 210 can be changed by the rider using the operating device 116 of the second embodiment in conjunction with the electric actuator 115.

The electronic controller 214 includes an arithmetic processing unit that executes predetermined control programs for controlling the components BC and the variable stem 210. The arithmetic processing unit includes, for example, a central processing unit (CPU) or a micro processing unit (MPU) that includes one or more processors. The electronic controller 214 can include one or more microcomputers. The electronic controller 214 can be formed of one or more semiconductor chips that are mounted on a printed circuit board. The term "electronic controller" as used herein includes hardware that executes a software program, but excludes a human. The electronic controller 214 includes a memory device that stores information used in various control programs and various control processes. The memory device is any computer storage device or any computer readable medium with the sole exception of a transitory, propagating signal. The memory device includes, for example, a nonvolatile memory and a volatile memory. The processor and the memory device of electronic controller 214 are provided, for example, at the housing in which the electric motor 215 is provided. Alternatively, the processor and the memory device of electronic controller 214 are provided in a housing that is separate from the housing of the electric motor 215.

Here, in this third embodiment, for example, the electric motor 215 is illustrated as being mounted on the stem body 24 and operatively coupled to the handlebar mount 22. More specifically, a reduction gear train 221 connects an output shaft 215*a* of the electric motor 215 to a pivot axle 250 that is fixed to the handlebar mount 22. In this way, as the electric motor 215 is operated, rotation of the output shaft 215*a* turns the pivot axle 250 and the handlebar mount 22 with respect to the stem body 24 to change the position of the stem body 24.

The component control system 212 further comprises at least one detector (e.g., at least one of detectors S1-S10) that are configured to detect information relating to a driving state of the human powered-vehicle B. The driving state includes at least one of riding condition, power, torque, cadence, velocity, acceleration, vehicle weight, weather, vehicle inclination, road surface condition, travelling route, and state of other components.

More specifically, in the third embodiment, the at least one detectors of the component control system 212 comprises an inclination sensor S1, a power sensor S2, a torque sensor S3, a cadence sensor S4, a forward velocity sensor S5, a vertical acceleration sensor S6, a weight sensor S7, a road surface condition sensor S8, a global position sensor S9 and a fitness detector S10. The inclination sensor S1 detects vehicle inclination of the human powered-vehicle B. The power sensor S2 detects power applied to the human powered-vehicle B. The torque sensor S3 detects torque applied to the human powered-vehicle B. The cadence sensor S4 detect a cadence of the human powered-vehicle B. The forward velocity sensor S5 detect a forward velocity of the human powered-vehicle B. The vertical acceleration sensor S6 detect a vertical acceleration of the human powered-vehicle B. The weight sensor S7 detect a weight of the human powered-vehicle B. The road surface condition sensor S8 detect road surface condition of a road surface that the human powered-vehicle B is travelling on. The global position sensor S9 detect travelling route the human powered-vehicle B. The fitness detector S10 detect a fitness of the human powered-vehicle B.

Figure 15:
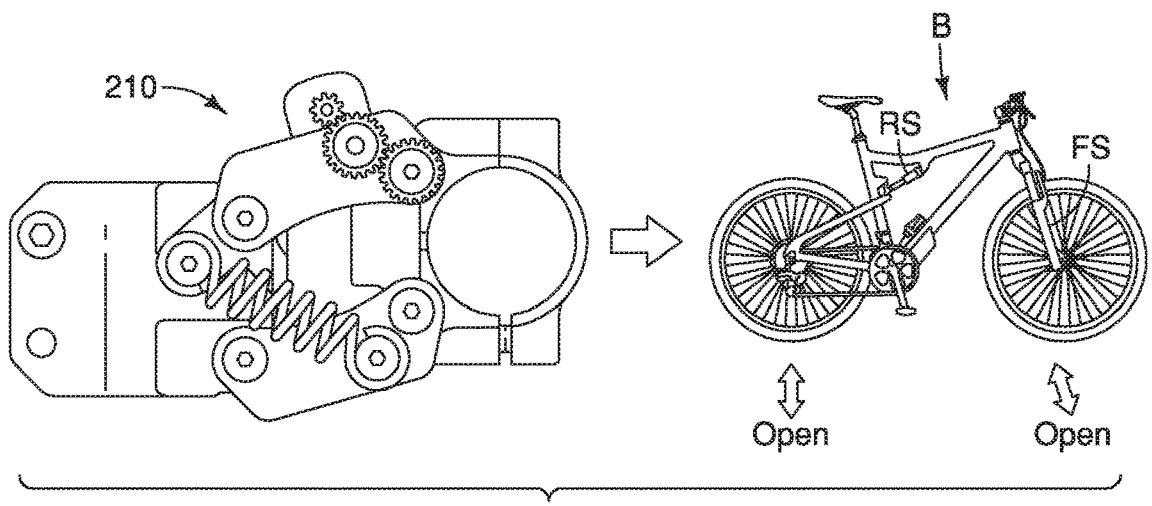
FIG. 15 is a schematic view showing a suspension control based on the variable stem of FIG. 13 being located in the first stem body position.
Figure 16:
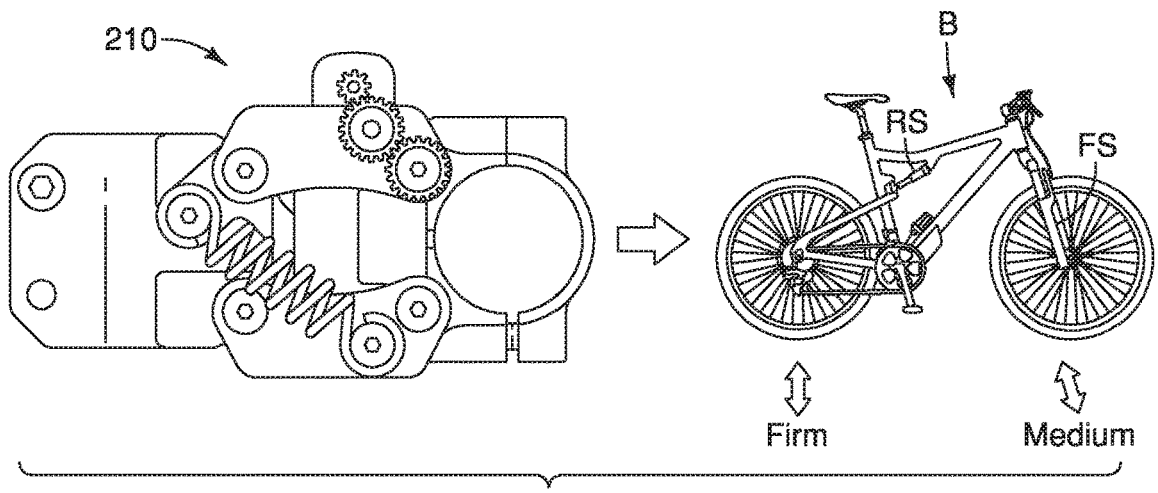
FIG. 16 is a schematic view showing a suspension control based on the variable stem of FIG. 13 being located in the third stem body position.
Figure 17:
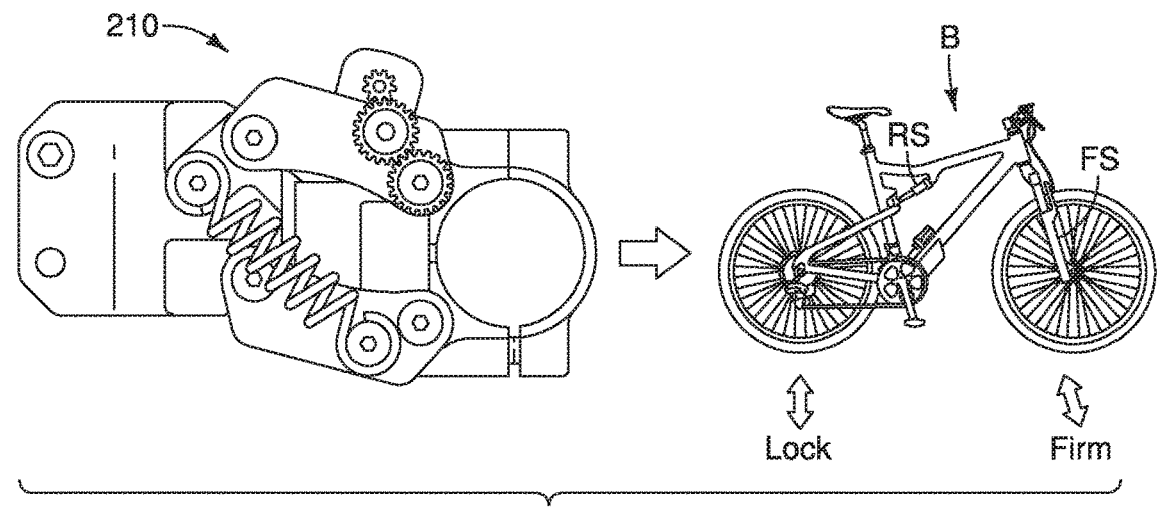
FIG. 17 is a schematic view showing a suspension control based on the variable stem of FIG. 13 being located in the second stem body position.

Referring to FIGS. 15 to 17, an example is illustrated in which the electronic controller 214 is configured to control a component (e.g., one or more of the components BC) in accordance to a position of the variable stem 210 as the state of the variable stem 210. In other words, the electronic controller 214 is configured to control a component (e.g., one or more of the components BC) that is different from the variable stem 210 in accordance with the information relating to the state of the variable stem 210. Here, FIGS. 15 to 17, the electronic controller 214 is configured to carry out a suspension control of the front suspension FS and/or the rear suspension RS based on the stem position of the variable stem 210. However, the electronic controller 214 is configured to controlling the front suspension FS and/or the rear suspension RS based on the stem position of the variable stem 210. Rather, the electronic controller 214 is configured to control a one or more of the components BC which includes at least one of a suspension, a height adjustable seatpost, a shifting device, a braking system, an assist unit, a lamp, and a cycle computer.

As mentioned above, depending on the riding conditions, different handlebar positions are often desired by the rider. Thus, in FIGS. 15 to 17, while the human powered-vehicle B is in a driving state, a rider can set the handlebar height by adjusting the stem body 24 of the variable stem 210 based on the conditions that the rider observes, and then the electronic controller 214 controls the front suspension FS and/or the rear suspension RS based on a stem position signal from one of the sensors 219. In the case of the rider setting the stem body 24 of the variable stem 210 to the first position (the high handlebar position) as seen in FIG. 15, the electronic controller 214, for example, controls the front suspension FS and the rear suspension RS to an open position for maximum damping based on the stem position signal from the sensor 219 located in the recess 71. In the case of the rider setting the stem body 24 of the variable stem 210 to the third position (the normal or middle handlebar position), as seen in FIG. 16, the electronic controller 214, for example, controls the front suspension FS to a medium stiffness setting and the rear suspension RS to a firm stiffness setting based on the stem position signal from the sensor 219 located in the recess 73. In the case of the rider setting the stem body 24 of the variable stem 210 to the second position (the low handlebar position), as seen in FIG. 17, the electronic controller 214, for example, controls the front suspension FS to firm stiffness setting and the rear suspension RS to a lock position (no rear damping—hard tail) based on the stem position signal from the sensor 219 located in the recess 72.

However, the control of a components based on the position of the stem body 24 of the variable stem 210 is not limited to controlling the front suspension FS and/or the rear suspension RS. Rather, the electronic controller 214 can be configured to change at least one of a height of the adjustable seatpost SP, a gear ratio of the shifting device (e.g., the front derailleur FD, the rear derailleur and/or an internal hub), a braking force of the brake system (e.g., the brake levers BL, the front brake device FB and the rear brake device RB), an assist force of the assist unit AM, a light angle or intensity of the lamp LP, and a parameter that is displayed on the cycle computer CC. By the combined adjustability of these components BC, the human powered-vehicle B can be tailored depending on rider preference and terrain requirements.

To utilize such optimal changes in real-time, the electronic controller 214 preferably includes at least an input parameter receiver, a threshold determiner, a comparator and a signal generator. The input parameter receiver receives input that includes at least one input parameter receiver with memory (multiple inputs are optional) such that the input parameters or sensed/measured parameters (e.g., real time acceleration, torque etc. from appropriate sensor) is buffered into the electronic controller 214. The threshold determiner that is configured for determining is a threshold has been met and/or exceeded, also configured for receiving a threshold value or range for the chosen parameter as input, which threshold value or range may then be stored at the electronic controller 214 or at some other memory storage. The comparator configured for comparing the input received by the input parameter receiver and the threshold determination determined by the threshold determiner. The comparison or operating function input can be stored at the electronic controller 214 or at some other memory storage. The signal generator that is configured to generate a signal based on the comparison performed by the comparator is connected to human powered-vehicle B component. The receiver, determiner, comparator and the signal generator can be connected through wire or wirelessly. In addition, a stabilization device can be included in the electronic controller 214 that suspends further controller action for a predetermined or settable amount of time to allow the parameter to adjust based on the recent change.

As mentioned above, depending on the riding conditions, different handlebar positions are often desired by the rider. For example, in an uphill position, it is preferable to have the handlebar lower in order to have better balance, as to maintain stable posture (might be easier to control the bicycle as the handlebar H is near to the rider in the uphill position). As for downhill, many riders prefer a higher handlebar position which is set by having higher stem position, and drop their seats to a slightly lower height when they attack an aggressive downhill trail to maintain balance and control. Sometimes in aero position, the handlebar position is preferably to be set lower than the seat. In flying position, the handlebar position is usually set higher above the seat. In contrast, for cross-country, the riding positions vary depending on the trail or road surface, so the normal flat position is preferred for handlebar position. During cornering also preferably to have normal stem position. In addition, the rider sometimes might want to change the handlebar H to a (slightly) higher to ease the strain on the body (e.g., back, neck etc.) after a long haul of normal or lower stem position. Basically, the riding condition not only related to the riding environment and bicycle itself, it is also related to rider. In addition, it is appreciated that the position is not limited to the embodiment, as different rider might require difference preferences in stem positioning or even the component controlling.

Power, torque, cadence, velocity, acceleration are basically related to the riding condition, but differ in each riding condition. Below is the example of each condition for reference (vary depending on terrain requirements or maybe rider preferences):

| Riding condition | Velocity (km/h) | Cadence (rpm) | Power (W) | Torque (Nm) | Acceleration (m/s$^2$) |
|---|---|---|---|---|---|
| Normal | 15 | 90 | 164 | 17 | 0.56 |
| Downhill | 30 | 0 | 0 | 0 | 2.22 |
| Uphill | 5 | 51 | 312 | 58 | 0.28 |

As you can see above, in the normal condition, the power is lower than for the uphill condition, but the cadence is higher, and the torque is lower in the normal condition as compared to the uphill condition. In contrast, the velocity and acceleration are lower in the uphill condition as compared to the normal condition. These parameters change depending on how the riding condition (including the gear ratio), and are not limited to those values (e.g., these parameters will also differ for professionals and amateurs).

Different riding conditions put different amounts of weight depending on the demands of the activity, so the vehicle weight is more likely to be balanced with the center-of-gravity of the rider. For example, when a rider is going on a downhill trail, the rider is more likely in non-sitting position or putting weight more behind the saddle SD to maintain gravity. So, the variable stem 10 is preferably to be set at the higher position (and the saddle SD is preferably to be lower).

In normal or rainy weather condition, it is preferable to have the normal stem position. But in a windy condition, if the resistance from the wind is strong, it is preferable to have normal or lower stem position for balance and to avoid the resistance. In some case, if the wind is blowing from backwards, higher stem position is sometimes needed in order to use the resistance to make the human powered-vehicle B is moves faster, and number of pedaling also can be reduced if necessary.

The road surface condition and the traveling route are also related to the riding condition. For example, riding through rough terrain will most likely requires normal stem position to have much more control and balance of the human powered-vehicle B. The stem position can be adjusted in accordance to the rider preferences while riding on a certain route/surface condition, and the next time the user rides the same route/surface condition (based on the GPS location), the settings can be adjusted automatically to where the rider had previously set them. It should be appreciated that the electronic controller 214 can also be used in conjunction with conditions of the other possible vehicle components.

In addition, the seat position also can be adjusted to the rider preferences, as the saddle height SD is important because rider needs to be comfortable (e.g., a slight difference in the reach can make the rider more prone to injury). Compression or knee pain injuries can occur if the saddle/seatpost is too low, and overstretching can occur if the saddle/seatpost is too high. The adjustment between the stem position and seatpost height is similar to the adjustment of the suspension and the stem position. It is also preferable to have the seatpost, suspension and the stem position adjusted in accordance to condition of each other.

The state of the shifting device can be determined not only by the operation of the user operated input (not shown), but it is also can be determined by change of power, torque, cadence, velocity, acceleration. As for the braking system, the actuation of the brake levers BL and the braking devices FB and RB also related to the change of power, torque, cadence, velocity, acceleration (the actuation also can affect the state of suspension which in turn can affect the stem position indirectly). In addition, the state of shifting device and the state of the braking devices FB and RB also can be related to the riding condition as well. The changes can be used/manipulated to adjust the stem position, and the stem position also can be used/manipulated to adjust the shifting device/braking system.

The assist motor AM is used to assist rider on pedaling. In a case where an assist unit is used, for example if the torque is larger than a predetermined value for a certain period, the assist unit can be configured to assist the rider. In this case, the stem can be adjusted to the actuation of the assist unit. In addition, the battery/power level of the assist unit also can be considered as a parameter to adjust the stem position. For example, if the battery/power level of the assist unit is low, the stem position can be adjusted automatically in order to provide better riding posture for a faster riding and power consumption. And the adjustment in the other way around is also possible, for example, the low stem position would likely indicate that the speed is needed for climbing (can be determine and confirmed from the memory of the controller), so the assist unit can be actuated to provide assist power for better climbing.

Rider's condition also included in the riding condition as roughly described before. For example, the fitness tracker S10 can be configured to monitor at least one of a rider's heart rate, a rider's muscle tension (mass), a rider's body weight (decreasing in kg unit if not hydrated), a rider's body temperature, a rider's sweating amount, a rider's blood pressure, a rider's breathing rate, and rider's brain waves. (power, torque also can be related to rider's condition as well because of pedaling etc.). In the heart rate case, for example, if the electronic controller 214 receives input from the fitness tracker S10 that monitors the heart rate as being lower than a given preprogrammed threshold while riding, then the electronic controller 214 can signal to the motor 215 to move the stem body 24 up or down, causing the rider's work rate and heart rate to increase or decrease. In addition, gender, age and height also can be considered for the stem position adjustment.

The adjustment of the lamp LP is basically related to stem position, for example, while descending (downhill), the stem position is preferable to be in a higher position so it would be appreciated if the lamp LP is open or in high beam to have a better view on what's in front of the human powered-vehicle B. Of course, this kind of adjustment combined with other information, such as riding environment (daylight, cloudy etc.), The cycle computer CC is adjusted in order to inform the rider on the real-time basis of the adjustments of the stem position and other ones of the components BC linked to the cycle computer CC. In contrast, the cycle computer CC also can be used as a device to set the program for adjustment of the stem position with or without information on any if the other ones of components BC.

Figure 18:
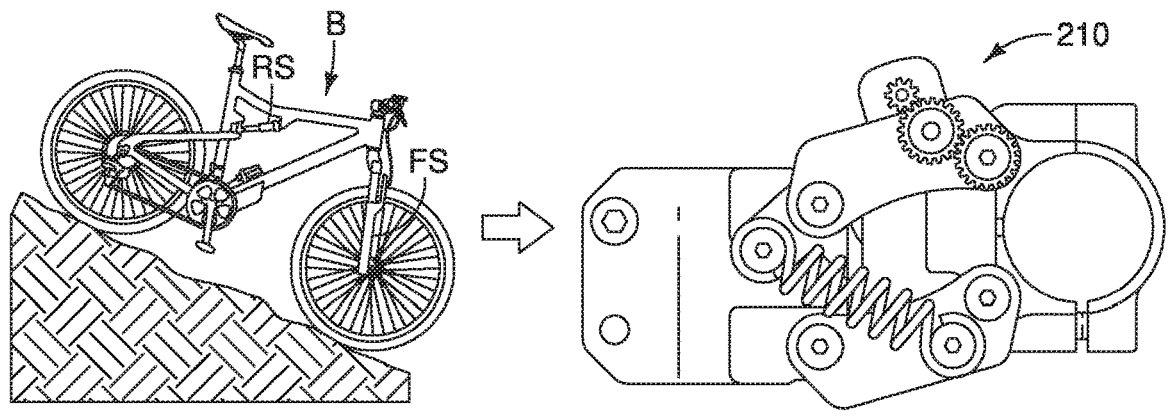
FIG. 18 is a schematic view showing a stem control of the variable stem of FIG. 13 to the first stem position based on the bicycle travelling on a downhill surface.
Figure 19:
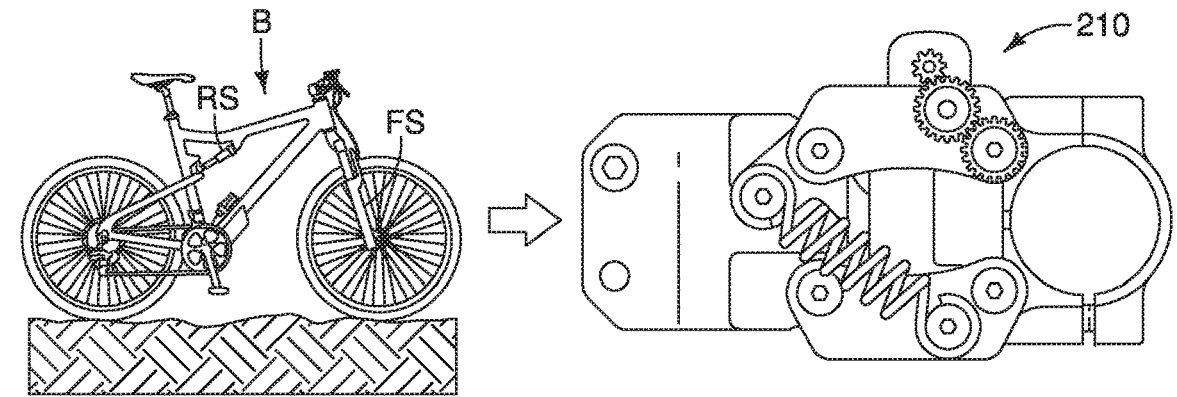
FIG. 19 is a schematic view showing a stem control of the variable stem of FIG. 13 to the second stem position based on the bicycle travelling on a level surface or substantially level surface.
Figure 20:
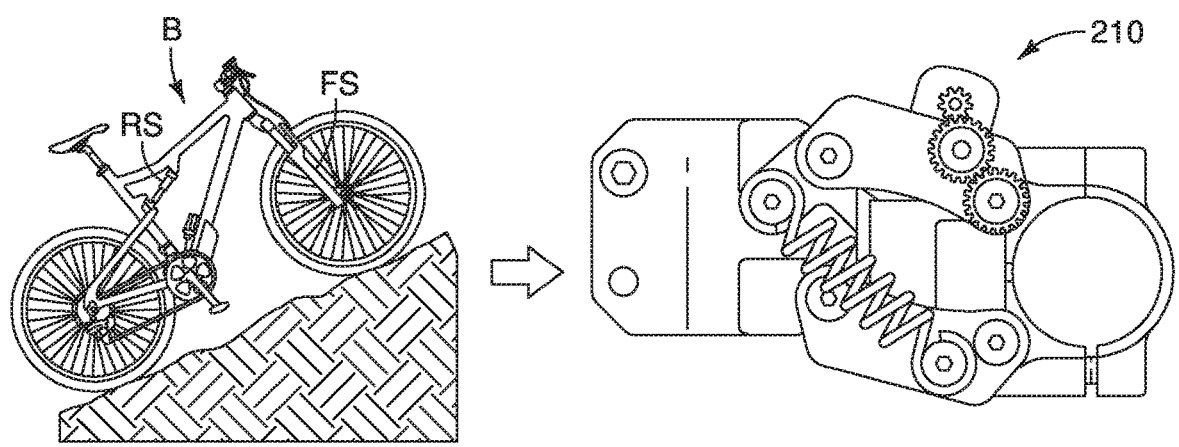
FIG. 20 is a schematic view showing a stem control of the variable stem of FIG. 13 to the third stem position based on the bicycle travelling on an uphill surface.

Referring to FIGS. 18 to 20, an example is illustrated in which the electronic controller 214 is configured to control the variable stem in accordance with the information relating to the driving state of the human powered-vehicle B. The driving state includes at least one of riding condition, power, torque, cadence, velocity, acceleration, vehicle weight, weather, vehicle inclination, road surface condition, travelling route, and state of other components. The state of the other components includes a state of at least one of a suspension state, a height adjustable seatpost state, a shifting device state, a braking system state, an assist unit state, a lamp state, and a cycle computer state.

Here, FIGS. 18 to 20, the electronic controller 214 is configured to carry out a stem control of the variable stem 210 based on a human powered-vehicle inclination (information relating to the driving state) of the bicycle B using, for example, the inclination sensor S1. More specifically, while the human powered-vehicle B is in a driving state, the position of the stem body 24 of the variable stem 210 is changed based on the human powered-vehicle inclination. Here, the inclination sensor S1 includes, for example, at least one of a gyro sensor and an acceleration sensor.

As seen in FIG. 18, when the human powered-vehicle B is travelling on a downhill, the inclination sensor S1 detects the vehicle inclination of the human powered-vehicle B as descending. The inclination sensor S1 outputs a vehicle inclination signal to the electronic controller 214. Then based on the vehicle inclination signal indicating the human powered-vehicle B is descending, the electronic controller 214 activates the electric motor 215 to change the position of the stem body 24 of the variable stem 210 to the first position, if the stem body 24 of the variable stem 210 is not in the first position as determined by the sensors 219.

As seen in FIG. 19, when the human powered-vehicle B is travelling on a substantially level surface or a level surface, the inclination sensor S1 detects the vehicle inclination of the human powered-vehicle B as being level. The inclination sensor S1 outputs a vehicle inclination signal to the electronic controller 214. Then based on the vehicle inclination signal indicating the human powered-vehicle B is level, the electronic controller 214 activates the electric motor 215 to change the position of the stem body 24 of the variable stem 210 to the third position, if the stem body 24 of the variable stem 210 is not in the third position as determined by the sensors 219.

As seen in FIG. 20, when the human powered-vehicle B is travelling on an uphill, the inclination sensor S1 detects the vehicle inclination of the human powered-vehicle B as ascending. The inclination sensor S1 outputs a vehicle inclination signal to the electronic controller 214. Then based on the vehicle inclination signal indicating the human powered-vehicle B is ascending, the electronic controller 214 activates the electric motor 215 to change the position of the stem body 24 of the variable stem 210 to the second position, if the stem body 24 of the variable stem 210 is not in the second position as determined by the sensors 219.

By changing the position of the stem body 24 according to the change of the gradient (vehicle inclination), the riding position can be kept properly, and at the same time, stable running can be realized by automatically controlling the effect condition of the suspension dampers of the front and rear suspensions FS and RS.

However, the control of the position of the stem body 24 of the variable stem 210 based on a driving state is not limited to control based on vehicle inclination. For example, the control of the position of the stem body 24 of the variable stem 210 based on the driving state includes at least one of riding condition, power, torque, cadence, velocity, acceleration, vehicle weight, weather, road surface condition, travelling route, a suspension state, a height adjustable seatpost state, a shifting device state, a braking system state, an assist unit state, a lamp state, and a cycle computer state. These driving states can be determined by the electronic controller 214 based on the signals from one or more of the detectors S1-S10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the variable stem. Accordingly, these directional terms, as utilized to describe the variable stem should be interpreted relative to a bicycle in an upright riding position on a horizontal surface and that is equipped with the variable stem. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A variable stem for a human-powered vehicle comprising:
    a head tube mount;
    a handlebar mount, one of the head tube mount and the handlebar mount including a plurality of recesses that are aligned along a same longitudinal plane along a length of the one of the head tube mount and the handlebar mount;
    a stem body coupling the handlebar mount to the head tube mount, the stem body being configured to be moved between a first position and a second position, the handlebar mount being disposed at a different location with respect to the head tube mount with the stem body in the first position as compared to the stem body being in the second position, the stem body includes a linkage interconnecting the head tube mount and the handlebar mount, the linkage including a first link and a second link, the first link having a first end pivotally coupled to the head tube mount and a second end pivotally coupled to the handlebar mount, and the second link having a first end pivotally coupled to the head tube mount and a second end pivotally coupled to the handlebar mount;
    a positioning structure configured to selectively position the stem body between a first position and a second position, the positioning structure including a movable member extending from one of the head tube mount and the handlebar mount to contact one of the recesses of the other of the head tube mount and the handlebar mount between the first and second links along a vertical direction of the head tube mount, and the movable member is movably coupled to the handlebar mount, the movable member being engaged to one of the head tube mount and the handlebar mount in a rest position, and the movable member being disengaged from the one of the head tube mount and the handlebar mount in an operated position; and
    a controller configured to control the positioning structure while the human-powered vehicle is in a driving state.

2. The variable stem according to claim 1, wherein the controller includes a driver configured to move the movable member between the rest position and the operated position.

3. The variable stem according to claim 2, wherein the driver includes a cable holder configured to hold a cable extending from an operating device.

4. The variable stem according to claim 1, wherein the positioning structure is configured to selectively position the stem body in a third position, the third position being arranged between the first position and the second position.

5. The variable stem according to claim 1, further comprising
    at least one sensor arranged to detect a current position of the stem body.

6. The variable stem according to claim 1, wherein the stem body is biased towards one of the first position and the second position.

7. The variable stem according to claim 1, wherein the movable member is movably coupled to the head tube mount.

8. The variable stem according to claim 1, wherein the movable member is vertically stationary with respect to one of the head tube mount and the handlebar mount.

9. The variable stem according to claim 1, wherein the movable member extends laterally between the first and second links of the linkage.

10. A variable stem for a human-powered vehicle comprising:
    a head tube mount;
    a handlebar mount;
    a stem body coupling the handlebar mount to the head tube mount, the stem body being configured to be moved between a first position and a second position, the handlebar mount being disposed at a different location with respect to the head tube mount with the stem body in the first position as compared to the stem body being in the second position;
    a positioning structure configured to selectively position the stem body between a first position and a second position, the positioning structure including a movable member movably coupled to one of the head tube mount and the handlebar mount, the movable member being engaged to one of the head tube mount and the handlebar mount in a rest position, the movable member being disengaged from the one of the head tube mount and the handlebar mount in an operated position; and
    a controller configured to control the positioning structure while the human-powered vehicle is in a driving state, the controller including a driver configured to move the movable member between the rest position and the operated position, the controller further including an electric actuator configured to activate the driver.

11. A component control system comprising:
a variable stem for a human-powered vehicle comprising
a head tube mount,
a handlebar mount,
a stem body coupling the handlebar mount to the head tube mount, the stem body being configured to be moved between a first position and a second position, the handlebar mount being disposed at a different location with respect to the head tube mount with the stem body in the first position as compared to the stem body being in the second position,
a positioning structure configured to selectively position the stem body between a first position and a second position,
a controller configured to control the positioning structure while the human-powered vehicle is in a driving state; and
at least one detector configured to detect information relating to the driving state of the human powered-vehicle, and the controller being an electronic controller that is configured to control the variable stem in accordance with the information.

12. The control system according to claim 11, wherein the driving state includes at least one of riding condition, power, torque, cadence, velocity, acceleration, vehicle weight, weather, vehicle inclination, road surface condition, travelling route, and state of other components.

13. The control system according to claim 12, wherein the state of the other components includes a state of at least one of a suspension state, a height adjustable seatpost state, a shifting device state, a braking system state, an assist unit state, a lamp state, and a cycle computer state.

14. A component control system comprising:
a variable stem for a human-powered vehicle comprising
a head tube mount,
a handlebar mount,
a stem body coupling the handlebar mount to the head tube mount, the stem body being configured to be moved between a first position and a second position, the handlebar mount being disposed at a different location with respect to the head tube mount with the stem body in the first position as compared to the stem body being in the second position,
a positioning structure configured to selectively position the stem body between a first position and a second position,
a controller configured to control the positioning structure while the human-powered vehicle is in a driving state; and
at least one sensor configured to detect information relating to a state of the variable stem, and the controller being an electronic controller configured to control a component different from the variable stem in accordance with the information.

15. The control system according to claim 14, wherein the electronic controller is configured to control the component in accordance to a position of the variable stem as the state of the variable stem.

16. The control system according to claim 14, wherein the component includes at least one of a suspension, a height adjustable seatpost, a shifting device, a braking system, an assist unit, a lamp, and a cycle computer.

* * * * *